US011233980B2

(12) United States Patent
Price et al.

(10) Patent No.: US 11,233,980 B2
(45) Date of Patent: Jan. 25, 2022

(54) MONITORING AND CORRECTION SYSTEM FOR IMPROVED LASER DISPLAY SYSTEMS

(71) Applicant: MICROSOFT TECHNOLOGY LICENSING, LLC, Redmond, WA (US)

(72) Inventors: Raymond Kirk Price, Redmond, WA (US); Yarn Chee Poon, Sammamish, WA (US); Fei Chen, Woodinville, WA (US)

(73) Assignee: MICROSOFT TECHNOLOGLY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/440,597

(22) Filed: Jun. 13, 2019

(65) Prior Publication Data
US 2020/0396426 A1 Dec. 17, 2020

(51) Int. Cl.
*H04N 9/31* (2006.01)
*G03B 21/20* (2006.01)
*G02B 5/04* (2006.01)

(52) U.S. Cl.
CPC ......... *H04N 9/3147* (2013.01); *H04N 9/3129* (2013.01); *G02B 5/04* (2013.01); *G03B 21/2033* (2013.01)

(58) Field of Classification Search
CPC ...... H04N 9/3147; H04N 9/3129; G02B 5/04; G03B 21/2033
See application file for complete search history.

(56) References Cited

U.S. PATENT DOCUMENTS

| 2007/0120983 A1* | 5/2007 | Yamamoto | H04N 9/3129 348/208.99 |
| 2007/0152129 A1* | 7/2007 | Li | G02B 27/104 250/201.3 |

(Continued)

FOREIGN PATENT DOCUMENTS

DE    102011079059 A1    1/2013

OTHER PUBLICATIONS

"International Search Report & Written Opinion issued in PCT Application No. PCT/US20/030163", dated Jul. 21, 2020, 17 Pages.

*Primary Examiner* — Michelle M Iacoletti
*Assistant Examiner* — Magda Cruz
(74) *Attorney, Agent, or Firm* — Workman Nydegger

(57) ABSTRACT

Techniques for improving laser image quality are disclosed herein. An ultra-compact illumination module includes multiple illuminators, photodetectors, and color filters. The illuminators each emit a different spectrum of light. Because of the compact nature of the module and the positioning of the illuminators relative to one another, the different spectrums of light overlap one another prior to being detected by the photodetectors. Each of the photodetectors is associated with a corresponding one of the illuminators, and each of the color filters is associated with a corresponding one of the photodetectors. Each color filter is positioned in-between its corresponding illuminator and photodetector and passes a particular spectrum of light while filtering out other spectrums of light. Consequently, the photodetectors each receive spectrally filtered light having passed through at least one of the color filters. The power output of the illuminators can also be corrected based on output from the photodetectors.

28 Claims, 23 Drawing Sheets

(56) References Cited

U.S. PATENT DOCUMENTS

| | | | |
|---|---|---|---|
| 2007/0285629 A1* | 12/2007 | Yavid | G03B 21/2033 |
| | | | 353/97 |
| 2009/0161705 A1 | 6/2009 | Almoric et al. | |
| 2009/0237622 A1 | 9/2009 | Nishioka et al. | |
| 2009/0284506 A1* | 11/2009 | Chikaoka | H04N 9/3155 |
| | | | 345/207 |
| 2010/0201894 A1* | 8/2010 | Nakayama | H04N 9/3185 |
| | | | 348/745 |
| 2012/0274909 A1 | 11/2012 | Schulz et al. | |
| 2014/0002514 A1* | 1/2014 | Richards | G02B 27/1026 |
| | | | 345/691 |
| 2017/0293166 A1* | 10/2017 | Rheme | G01S 7/4812 |
| 2018/0035087 A1* | 2/2018 | Xu | H04N 9/3155 |

* cited by examiner

MONITORING AND CORRECTION SYSTEM FOR IMPROVED LASER DISPLAY SYSTEMS

BACKGROUND

A laser (aka "illuminator" or "laser diode") is a type of device that generates a beam of coherent light. Most lasers include a resonant cavity that is defined by the structure of the laser and that spans the length of the laser. When current is injected into the laser, spontaneously emitted photons are generated. Some of these spontaneously emitted photons will successfully couple to the laser's resonant cavity. Provided that the laser is biased above its lasing current threshold, the photon density will increase inside of the resonant cavity and eventually a pulse of laser light will be generated and emitted from the laser.

Lasers can be used in many different applications. For instance, lasers can be used for communication, biomedical imaging, precision metrology, and even for generating images, such as for virtual-reality or augmented-reality (collectively "mixed-reality") systems.

In many scenarios, especially in mixed-reality systems, a laser operates in conjunction with one or more collimating optic(s), beam combiner(s) (e.g., a dichroic prism), photodiodes/photodetectors, and even microelectromechanical scanning ("MEMS") mirror systems (or simply "MEMS system"). For instance, many mixed-reality systems use a combination of red, green, and blue (RGB) lasers to generate virtual image content for a mixed-reality scene. The laser light generated by the RGB (and/or IR) lasers is often collimated through a collimating optic and then spatially/optically combined via a beam combiner. The combined beam is then directed to a MEMS mirror system, which then redirects the light in order to raster individual pixels of an image frame so as to "paint" an image for a user to view and interact with.

By way of example, FIG. 1 illustrates an illumination system 100 that includes an RGB module 105. RGB module 105 includes different illuminators, such as illuminator 110A (e.g., a red laser), illuminator 110B (e.g., a green laser), and illuminator 110C (e.g., a blue laser). Of course, any one of the lasers can be a red laser, a green laser, a blue laser, or even an infrared laser. While the majority of this disclosure focuses on red, green, and blue lasers, it should be appreciated that an infrared laser can also be included among the illuminators and can be configured in any of the manners disclosed herein. These illuminators emit corresponding laser light, such as light 115A, light 115B, and light 115C. A dichroic beam combiner 120 spectrally combines the laser light using one or more dichroic prisms (e.g., prism 120A).

Some of the laser light (e.g., leaked light 125A, 125B, and 125C) is allowed to leak through the dichroic beam combiner 120 in order to measure the power output of the illuminators 110A-110C using photodetectors (aka photodiodes, monitor-photodiodes ("MPDs"), or simply "PD"), such as PDs 130A, 130B, and 130C. PDs 130A-130C are integrated into the illumination system 100, and they produce a current output that is proportional to the output optical power of the illuminators 110A-110C. Consequently, the PDs 130A-130C can be used to more accurately control the power output of the illuminators 110A-110C. This control is beneficial because the transfer functions, which define the ratio between current-in to power-out and which are dependent on laser current threshold and slope efficiency, of the (laser) illuminators 110A-110C can change under different conditions. For instance, the transfer functions (and resulting output optical power) can change based on environment factors (e.g., temperature), age, extended use, and so on. As such, it is highly desirable to dynamically adjust or re-calibrate an illuminator in response to any changes in the illuminator's performance.

After light is combined using the dichroic beam combiner 120, the combined light 135 can be directed towards a MEMS system 140. MEMS system 140 includes a fast scan unit 145 (e.g., for rastering laterally positioned pixels positioned within the same horizontal plane by quickly redirecting light in a horizontal oscillating direction 150), any number of redirecting mirrors/relay optics (e.g., redirecting mirror 155), and a slow scan unit 160 (e.g., for moving the laser rastering/painting position to a new line of horizontally aligned pixels by redirecting light in a vertical oscillating direction 160). Eventually, the light is directed towards a display 165 (or a waveguide), where individual pixels are then rastered one pixel after another in each line and one line after the other. As shown, the display 165 (or waveguide) may be associated with a horizontal blanking area 170 and/or a vertical blanking area 175, both of which can be used to help reset or potentially calibrate the lasers and/or the MEMS system 140.

As described earlier, to finely control the output of a laser (especially due to changing operational conditions such as changes to the laser's lasing current threshold or its slope efficiency), a portion of the laser's laser light is measured by a photodiode/photodetector. As laser-based systems become more advanced, it is becoming more and more desirable to employ lasers and associated components (e.g., collimating optics, beam combiners, photodiodes/photodetectors, and MEMS systems) that have small/smaller form factors. Use of smaller units means that more hardware can be packaged together at reduced costs. Unfortunately, one consequence of tightly packaging the illuminators and photodetectors together means that multiple beams of laser light will often geometrically/spatially overlap with one another, causing "crosstalk" between the monitoring photodiodes and causing a reduced ability to accurately determine a particular laser/illuminator's output optical power. To clarify, stray light is a substantial cause of crosstalk, and stray light can occur in significant amounts when illuminator modules are designed to be very small. Accordingly, there is a substantial need in the field to improve how a laser/illuminator's output optical power is determined when multiple illuminators are positioned in a confined manner and when multiple beams of laser light geometrically overlap.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments generally relate to ultra-compact illumination/projector modules that provide improved laser image quality, even when multiple beams of laser light geometrically overlap.

In some embodiments, the ultra-compact illumination/projector module includes multiple illuminators, multiple photodetectors, and multiple color filters. The illuminators each emit a different spectrum of light. As a result of the beam combination optics and the compact nature of the module and the positioning of the illuminators relative to one another, the different spectrums of light physically overlap one another prior to being detected by the photodetectors. Each one of the photodetectors is associated with a corresponding spectrum of the illuminators, and each one of the color filters is associated with a corresponding one of the photodetectors. Each color filter is positioned in-between its corresponding illuminator and its corresponding photodetector (relative to a travel path of the illuminator's emitted light) and passes a particular spectrum of light while filtering out other spectrums of light. Consequently, the photodetectors each receive spectrally filtered light having passed through at least one of the color filters and being rejected by the other color filters. Using the color filters helps eliminate the impact of overlapping light, which can lead to optical crosstalk. Additionally, stray light (i.e. light that leaks are streaks away from an intended location) is a primary cause of crosstalk.

In some embodiments, the ultra-compact illumination/projector module includes a first illuminator (or perhaps a set of illuminators) that emits a first spectrum of light. A first photodetector is configured to determine the power output for the first illuminator (or set of illuminators) based on detecting at least some of the first spectrum of light. The module also includes a first color filter positioned between the first illuminator (or set of illuminators) and the first color photodetector. The first color filter filters out spectrums of light different from the first spectrum of light, thereby enabling the first photodetector to avoid detecting spectrums of light different from the first spectrum. The module also includes a second illuminator (or a second set of illuminators) that emits a second spectrum of light. A second photodetector is configured to determine a power output for the second illuminator(s) based on detecting at least some of the second spectrum of light. The module also includes a second color filter positioned between the second illuminator(s) and the second photodetector. The second color filter filters out spectrums of light different from the second spectrum of light. Additionally, because the pitch distance between the first illuminator and the second illuminator is set to within a predetermined compact range, certain conditions occur. One condition results in some of the second spectrum of light spatially overlapping some of the first spectrum of light received at the first color filter. The first color filter filters out the second spectrum of light so that the second spectrum of light is prevented from reaching the first photodetector. Another (additional or alternative) condition results in some of the first spectrum of light spatially overlapping some of the second spectrum of light received at the second color filter. The second color filter filters out the first spectrum of light so that the first spectrum of light is prevented from reaching the second photodetector.

In some embodiments, the ultra-compact illumination/projector module includes multiple illuminators, multiple photodetectors, and multiple color filters. The illuminators each emit a different spectrum of light. Furthermore, pitch distances between any two of the illuminators are set to compact values of less than about 1.0 millimeter, thereby causing the different spectrums of light to geometrically overlap one another prior to being detected by the photodetectors. Each one of the photodetectors is associated with a corresponding one of the illuminators, and each one of the color filters is associated with a corresponding one of the photodetectors. Each color filter is positioned in-between its corresponding illuminator and its corresponding photodetector (relative to a travel path of the illuminator's emitted light) and passes a particular spectrum of light while filtering out other spectrums of light. Consequently, the photodetectors each receive spectrally filtered light having passed through at least one of the color filters. Additionally, at least one of the color filters includes at least one of the following: one or more dielectric coatings disposed on (or stacked on) glass that is positioned adjacent to a corresponding photodetector, or an integrated dielectric material (or stack of multiple dielectric materials) applied directly to the corresponding photodetector.

In some embodiments, a display system is configured to pulse a first illuminator, which is associated with a primary photodetector, to generate an emission of laser light. The system then measures the emission of laser light at the primary photodetector. Simultaneously with that measuring process, the system also measures the emission of laser light at a different photodetector, which operates as a primary photodetector for a different illuminator positioned within the same shared housing as the first illuminator. The system also identifies crosstalk between the primary photodetector and the different photodetector using measurements obtained from both of the measuring processes. The system generates an adjustment value for adjusting a power output transfer function of the first illuminator based on the identified crosstalk between the two photodetectors. The power output transfer function of the first illuminator is then adjusted using the adjustment value. Thereafter, for a subsequent pulse of the first illuminator, the system controls the subsequent pulse (or rather controls the first illuminator) using the adjusted power output transfer function.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
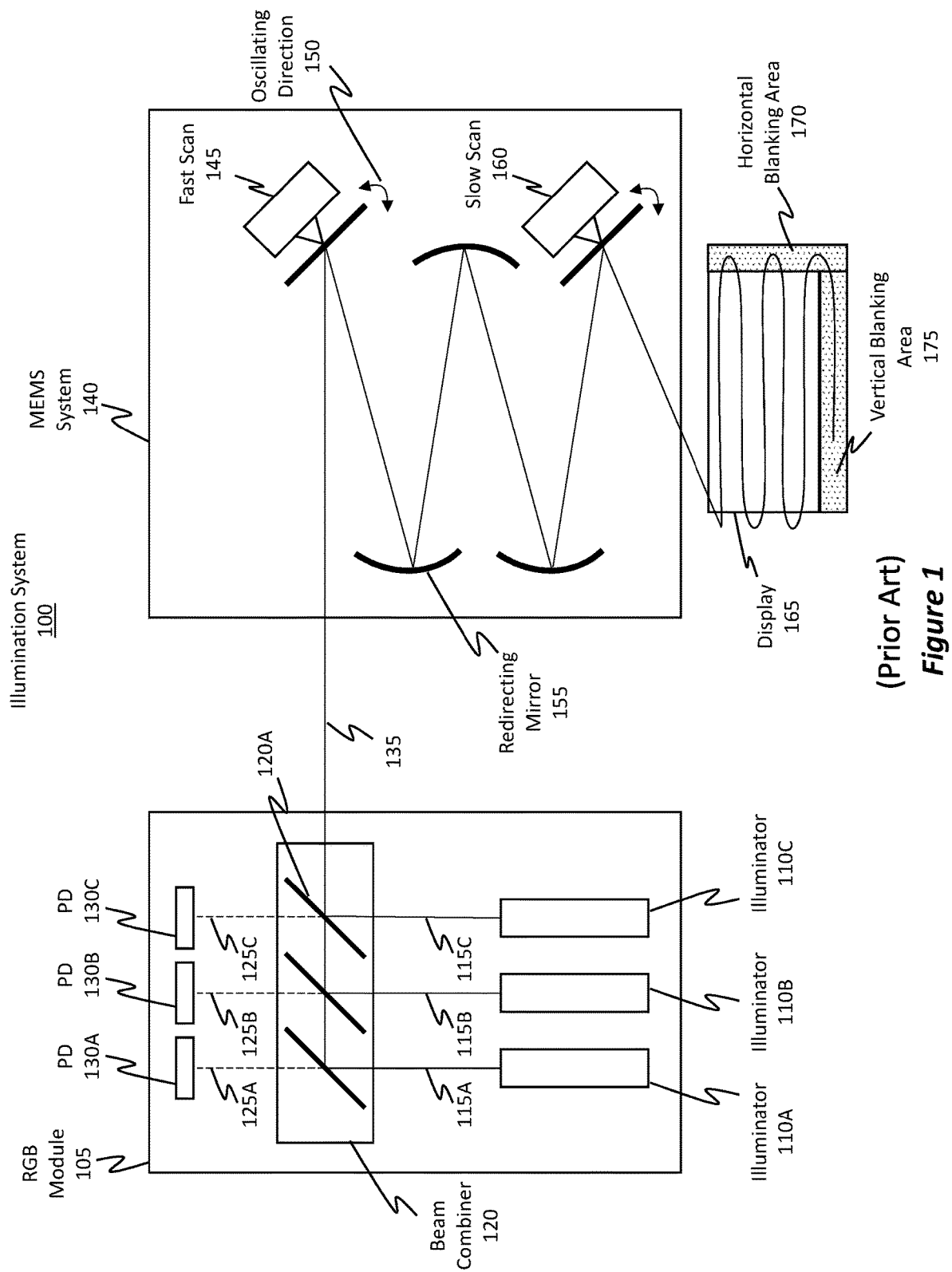
FIG. 1 illustrates an example of a laser-based illumination system that uses photodetectors (aka "photodiode" or "Monitor-Photodiode" ("MPD")) to control the power output of the lasers/illuminators.

The disclosed embodiments generally relate to ultra-compact illumination/projector modules that provide improved laser image quality, even when laser light beams geometrically overlap with one another.

In some embodiments, the ultra-compact illumination/projector module includes multiple illuminators, photodetectors, and color filters. Because the module is so compact, the different spectrums of light emitted by the illuminators geometrically overlap prior to being detected by the photodetectors. Each photodetector is associated with a corresponding illuminator, and each color filter is associated with a corresponding photodetector. Each color filter is positioned in-between its illuminator and its photodetector and passes a particular spectrum of light while filtering out other spectrums of light.

In some embodiments, the ultra-compact module includes a first illuminator (or a set of multiple illuminators) that emits a first spectrum of light. As used herein, reference to an illuminator should be interpreted broadly to mean both a scenario in which a single illuminator is used to emit a spectrum of light or, alternatively, a scenario in which multiple illuminators all emit the same spectrum or wavelength of light. In this regard, an illuminator may include multiple laser emitters. A first photodetector measures the power output for the first illuminator by detecting some of the first spectrum of light. The module also includes a first color filter positioned between the first illuminator and the first color photodetector. The first color filter filters out some light while permitting the first spectrum of light to strike the first photodetector. The module also includes a second illuminator that emits a second spectrum of light. A second photodetector measures the power output for the second illuminator by detecting some of the second spectrum of light. The module also includes a second color filter positioned between the second illuminator and the second photodetector. The second color filter filters out some light while permitting the second spectrum of light to strike the second photodetector. Additionally, because the pitch distance between the first illuminator and the second illuminator is set to within a predetermined compact range, certain conditions occur. One condition results in some of the second spectrum of light spatially overlapping some of the first spectrum of light. The first color filter filters out the second spectrum of light so that the second spectrum of light is prevented from reaching the first photodetector. Another (additional or alternative) condition results in some of the first spectrum of light spatially overlapping some of the second spectrum of light. The second color filter filters out the first spectrum of light so that the first spectrum of light is prevented from reaching the second photodetector.

In some embodiments, the ultra-compact illumination module includes multiple illuminators, photodetectors, and color filters. The illuminators each emit a different spectrum of light. Furthermore, pitch distances between any two of the illuminators are set to compact values of less than about 2.0 millimeters, 1.0 millimeter, or even 0.5 millimeters, thereby causing the different spectrums of light to geometrically overlap one another prior to being detected by the photodetectors. Each photodetector is associated with a corresponding illuminator, and each color filter is associated with a corresponding photodetector. Each color filter is positioned in-between its illuminator and its photodetector and passes a particular spectrum of light while filtering out other spectrums of light. At least one of the color filters includes at least one of the following: one or more dielectric coatings disposed on (or stacked on) glass that is positioned adjacent to a corresponding photodetector, or an integrated dielectric material (or stack of multiple dielectric materials) applied directly to the corresponding photodetector.

In some embodiments, a display system is configured to pulse a first illuminator, which is associated with a primary photodetector, to generate an emission of laser light. In some cases, the emission of laser light is performed during the display horizontal or vertical blanking periods such that the emission of laser light may be directed at a horizontal or vertical blanking area. The system measures the emission at the primary photodetector. Simultaneously with that process, the system measures the emission at a different photodetector, which operates as a primary photodetector for a different illuminator positioned within the same shared housing as the first illuminator. The system identifies crosstalk between the primary photodetector and the different photodetector using the two measurements. The system generates an adjustment value for adjusting a power output transfer function of the first illuminator based on the identified crosstalk. The power output transfer function is adjusted using the adjustment value. For a subsequent pulse of the first illuminator, the system controls the subsequent pulse (or rather controls the first illuminator) using the adjusted power output transfer function.

Technical Benefits And Advantages

As different form factors (e.g., head-mounted devices ("HMDs") such as glasses) are developed for mixed-reality display systems, it is becoming increasingly more desirable to use ultra-compact RGB modules and display module assemblies. Unfortunately, the traditional approach of picking off the individual red, green, and blue laser light with a dichroic beam combiner optic (e.g., as shown in FIG. 1) to determine the laser's power output is not feasible or practical with the compact optical design requirements of these ultra-compact units. This impracticality is especially true when faced with the light overlap conditions discussed earlier. To clarify, due to the compact nature of the module, the beam collimation and spectral beam combination result in overlapping R, G, and B laser beams. The different spectrums of light emitted by the illuminators spatially overlap as a result of the divergence angles of those illuminators. Therefore, as described earlier, there is a substantial need to provide an improved technique for sampling light to better control the output optical power of the illuminators and to address the increasing presence of light overlap, which can lead to crosstalk.

The disclosed embodiments can be used to provide some solutions to these problems in a number of different ways, which are discussed briefly in this section and which will be discussed in more detail to follow. Briefly, some solutions are focused on the use of certain color filters that are specially designed and placed at particular locations within the illumination module so as to effectively mitigate the light overlap conditions. Some additional solutions are focused on the use of a programmatically determined adjustment value (e.g., a correction matrix) that can be applied to the illuminator's transform function to dynamically decontaminate, re-calibrate, or compensate for crosstalk between the photodetectors, which crosstalk occurs as a result of the overlapping light. The amount of crosstalk between the photodetectors can vary depending on a number of factors. These factors include, but are not limited to, the filtering characteristics of the color filters, the collimation characteristics of the collimating optics, the amount of overlap between the laser beams, the proximity of the photodetectors to one another, the pitch distances between the illuminators, and so on. The amount of crosstalk can vary widely, with crosstalk values being as low as 1% and as high as 10%, 15%, or even 20%. This amount of optical crosstalk can substantially impact the accuracy of the feedback system that is used to provide color correction for laser-based display systems.

The disclosed embodiments provide significant improvements to the technical field by substantially improving how illuminators are controlled, thereby increasing the quality of any images generated by these illuminators. In this regard, the disclosed embodiments are directed to improved techniques for controlling the operation of lasers used in a display system. Additional benefits include the ability to use smaller form factors for these illumination systems, thereby allowing more hardware to be packaged together.

Ultra-Compact Illumination Modules

Figure 2:
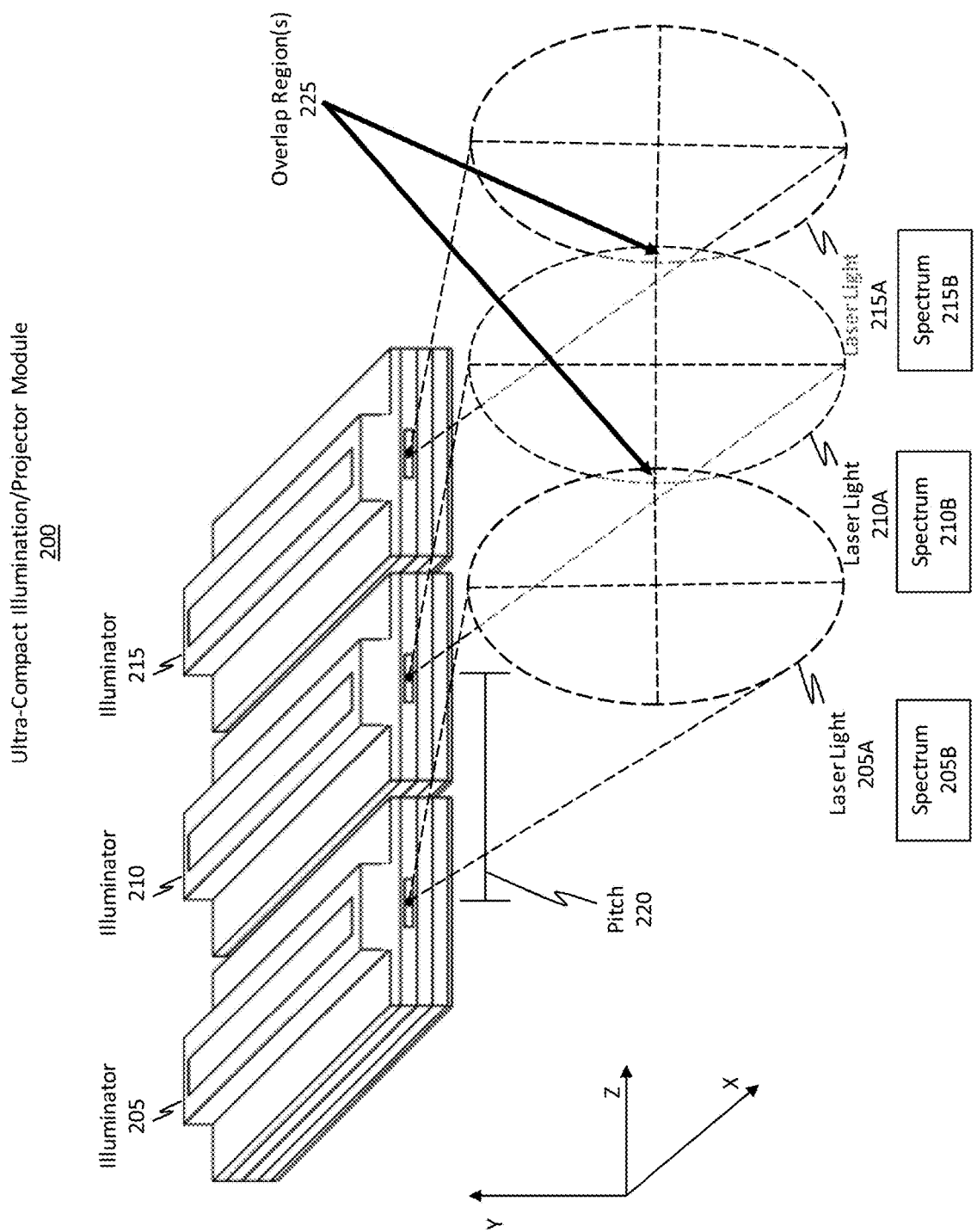
FIG. 2 illustrates a scenario where the illuminators (e.g., lasers or laser diodes) are positioned so close to one another (e.g., in an ultra-compact configuration) that the emitted laser light beams geometrically/spatially overlap with one another.

Attention will now be directed to FIG. 2, which illustrates an ultra-compact illumination/projector module 200 that includes any number of illuminators, such as illuminator 205, illuminator 210, and illuminator 215. As used herein, the terms "illuminator," "laser," "projector," and "laser diode" can be used interchangeably and generally refer to any light-emitting device that generates light having coherence levels widely recognized or classified as adequately being "laser" light. Although three illuminators are shown in FIG. 2, it will be appreciated that at least two illuminators (though potentially an unbounded number) may be provided in the ultra-compact illumination/projector module 200. That is, the number of illuminators may be 2, 3, 4, 5, 6, 7, 8, 9, 10, or more than 10. As described earlier, there may be multiple illuminators that each emit the same spectrum of light. As such, the term "illuminator" should be interpreted broadly to encompass situations involving a single laser diode as well as situations involving multiple laser diodes that each emit the same/common spectrum of light. Accordingly, an illuminator may include one or more laser emitters (e.g., 1, 2, 3, etc. laser emitters).

The illuminators 205, 210, and 215 may be any type of illuminator. For instance, the illuminators can be red laser diodes, green laser diodes, blue laser diodes, infrared laser diodes, or any combination of the above. In a preferred embodiment, the illuminators 205, 210, and 215 include a red laser diode, a green laser diode, and a blue laser diode. Illuminators 205, 210, and 215 can be single section laser diodes or multi-section laser diodes.

FIG. 2 shows how the illuminators 205, 210, and 215 are able to emit laser light, such as laser light 205A, laser light 210A, and laser light 215A, respectively. As an example only, laser light 205A can be light within the red spectrum (i.e. red laser light), laser light 210A can be light within the green spectrum (i.e. green laser light), and laser light 215A can be light within the blue spectrum (i.e. blue laser light). Spectrum 205B, spectrum 210B, and spectrum 215B are provided to illustrate how the laser light 205A, 210A, and 215A are all preferably within different light spectrums (e.g., spectrum 205B can be in the red spectrum, spectrum 210B can be in the green spectrum, and spectrum 215B can be in the blue spectrum).

FIG. 2 also shows the distance between the different emitters of the illuminators 205, 210, and 215. This distance is referred to herein as the pitch, or pitch distance, and is illustrated via the label named pitch 220. As discussed earlier, the illuminators 205, 210, and 215 are arranged or positioned very closely relative to one another, meaning the pitch 220 is set to an ultra-small or ultra-compact value.

For example, the pitch distance (e.g., pitch 220) between any two adjacent illuminators (e.g., illuminators 205 and 210, or, alternatively, illuminators 210 and 215, or, potentially, (depending on the configuration) illuminators 205 and 215) comprises a predetermined compact value within a range of about 0.2 millimeters (mm) and 2.0 mm, or between 0.2 mm and 1.0 mm. In some embodiments, the range is between about 0.3 mm and 0.5 mm. In some cases, the range is between about 0.3 mm and 0.4 mm. In some other embodiments, the pitch 220 is about 0.35 mm.

As a result of pitch 220 being set to within the compact range described above, the emitted laser light from the illuminators (e.g., laser light 205A, 210A, and 215A) often geometrically or spatially (but perhaps not spectrally) overlaps with one another, as shown by the overlap regions 225. This overlap also occurs as a result of the divergence emission angles of the multiple illuminators (i.e. how broadly the light spreads after being emitted). This light overlap condition can cause a phenomenon referred to herein as "crosstalk." As will be described in more detail later, crosstalk occurs when the laser light from one laser is detected by multiple photodetectors, even though only a single photodetector is supposed to detect the light for that one laser.

It will be appreciated that the different emissions of light can overlap with one another at different degrees. For instance, one beam of light can overlap another beam as little as 1%, 2%, 3%, 4%, 5% and so on. On the other hand, one beam of light can overlap another beam as much as 80%, 85%, 90%, 95%, or even 99%. Three or more beams can overlap one another to these varying percentage values as well. As such, there is no limitation with regard to the amount of overlap that may occur between the different beams. Indeed, the amount of overlap (i.e. spatial or geometric overlap but not spectral overlap) between any number of beams can vary within the range of 1% up to 99% overlap, with any value in-between. Because the illuminators emit different spectrums of light (e.g., red light, green light, and blue light), there will be little-to-no spectral overlap between the emissions.

As an example, suppose a laser-based display system is to render a mixed-reality scene showing a blue sky. In situations where crosstalk occurs (i.e. the blue laser light bleeds, leaks, or strays across the housing and is detected by other photodetectors), the red and green photodetectors (i.e. the photodetector configured to detect the red laser's light and the photodetector configured to detect the green laser's light, respectively) may both generate responses even though no red or green light is actually being generated. As such, the overlapping blue light will be interpreted by the red and green photodetectors as being light in the red and green spectrums. Consequently, the system will provide an inaccurate color estimation and may attempt to perform corrections or compensations based on these inaccurate readings, thereby significantly (and inaccurately) altering the mixed-reality scene. It should be noted that crosstalk can occur for each individual pixel within an image frame and even for an entire image frame in a MR scene. As such, the effects of crosstalk can significantly hamper or perturb the accuracy of the illumination system. Therefore, it is highly desirable to resolve crosstalk issues, especially in ultra-compact illumination systems.

The following section, beginning with "Using Color Filters To Compensate For Crosstalk," will discuss different example techniques to compensate for crosstalk. These techniques focus on the use of physical color filters to eliminate overlapping light. A later section, beginning with "Using Programmatic Adjustments To Compensate For Crosstalk," will discuss other example techniques to compensate for crosstalk. These other techniques apply a correction matrix to an illuminator's transfer function.

Using Color Filters to Compensate for Crosstalk

Figure 3A:
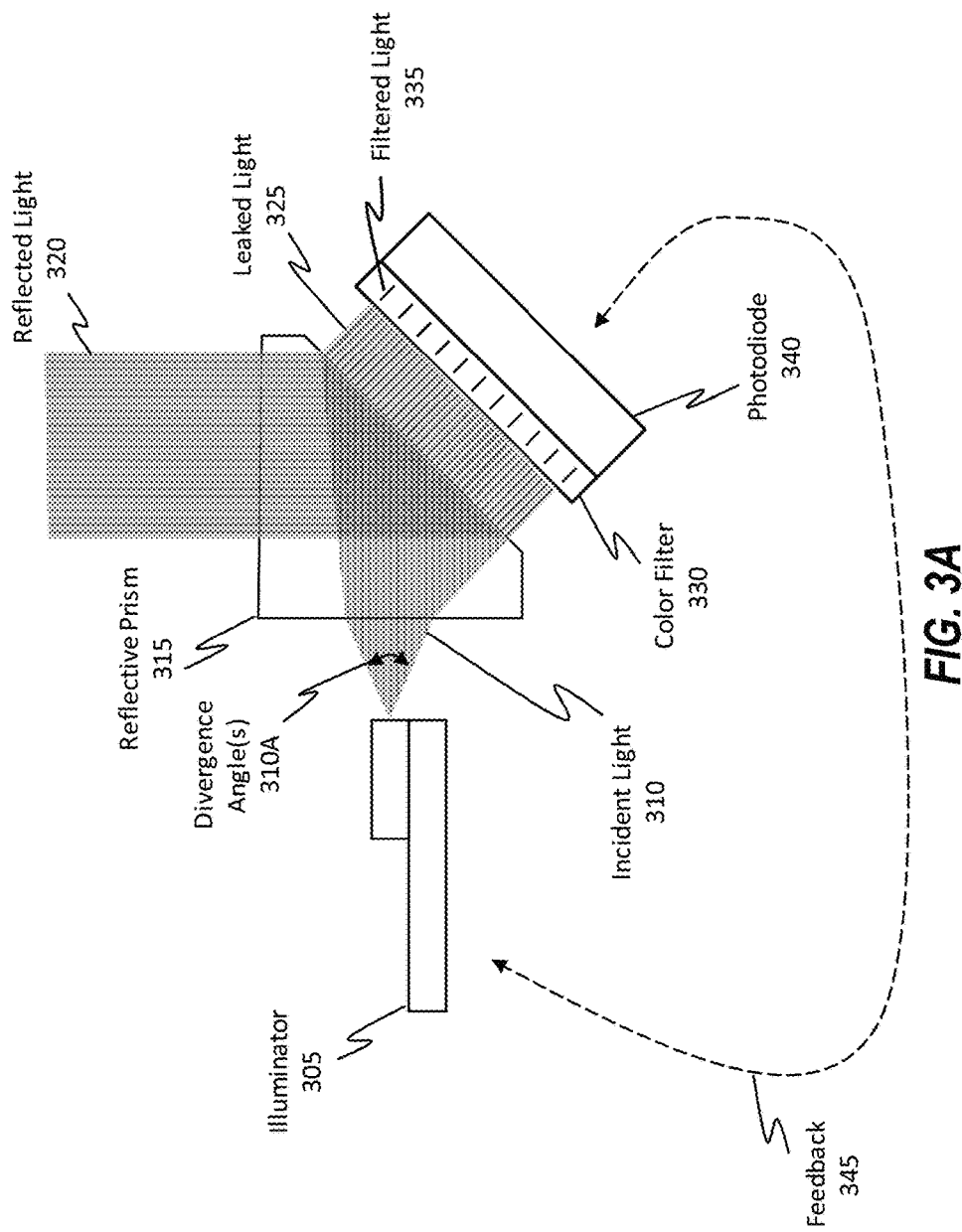
FIG. 3A illustrates a unique configuration in which a color filter is positioned proximately to an MPD and operates to allow a certain spectrum of light to pass through it while filtering out other spectrums of light, thereby operating as a bandpass filter and thereby mitigating the light overlap condition, which may lead to crosstalk.

FIG. 3A shows an ultra-compact illumination module 300A that includes an illuminator 305. Ultra-compact illumination module 300A may be configured in a manner similar to that of ultra-compact illumination/projector module 200 of FIG. 2. For instance, illuminator 305 can be configured in a manner similar to that of the illuminators in FIG. 1 or 2. Furthermore, although only a single illuminator is depicted in FIG. 3A, it will be appreciated that multiple illuminators (e.g., at least two) will be present in the ultra-compact illumination module 300A.

Illuminator 305 is shown as being pulsed to generate an emission of light (e.g., incident light 310) having a particular spectrum (e.g., red, green, blue, or infrared) and being emitted from the illuminator 305 are one or more divergence angle(s) 310A. Incident light 310 is directed towards a reflective prism 315 which operates to redirect some of the incident light 310 in different directions. For instance, reflective prism 315 allows some light (e.g., reflected light 320 to be reflected out of plane relative to the incident angle of the incident light 310. This reflection angle can be set to any angle and is not restricted to any particular angle. The common range for this reflection angle is between 30 degrees and 150 degrees. Redirecting the light in this manner allows for different hardware packaging configurations and allows the system to be more flexible in terms of compactness.

Reflective prism 315 is also shown as reflecting some of the incident light 310 towards a different location. That is, reflective prism 315 allows some of the incident light 310 to leak through the reflective prism 315 to form leaked light 325. Leaked light 325 is then directed towards a color filter 330.

Color filter 330 operates as a bandpass filter and passes a particular spectrum of light through the color filter 330 while filtering out other spectrums of light. For instance, filtered light 335 symbolizes the spectrum of light permitted to pass through the color filter 330. Filtered light 335, after passing through the color filter 330, then strikes photodiode 340, which operates to determine the output optical power of illuminator 305 as described earlier and which can provide feedback 345 to the ultra-compact illumination module 300A to better control the illuminator 305.

It should be noted that reflected light 320 constitutes a majority of the incident light 310 while the leaked light 325 constitutes a minority of the incident light 310. In some cases, the reflected light 320 constitutes 80%, 85%, 90%, 95%, 96%, 97%, 98%, or even 99% of the incident light 310. Similarly, the leaked light 325 constitutes 20%, 15%, 10%, 5%, 4%, 3%, 2%, or only 1% of the incident light 310. In this regard, only a small fraction or percentage of the incident light 310 is used to determine the output optical power of the illuminator 305.

When the ultra-compact illumination module 300A includes multiple illuminators (e.g., as shown in FIG. 2), then each illuminator emits a different spectrum of light. Furthermore, these illuminators are positioned relative to each other so that the different spectrums of light emitted from the illuminators geometrically overlap (e.g., as shown by overlap region(s) 225 in FIG. 2) prior to being directed to multiple photodetectors (e.g., one of which being photodiode 340). These multiple photodetectors include a different photodetector for each one of the multiple illuminators. For instance, in FIG. 3A, photodiode 340 is specifically associated with illuminator 305.

Additionally, the ultra-compact illumination module 300A will include multiple color filters, one of which is color filter 330, where a different color filter is provided for each one of the photodetectors. Each color filter is positioned proximately to its corresponding photodetector (e.g., color filter 330 is positioned proximately to photodiode 340) and in-between that photodetector and a corresponding illuminator. For instance, relative to a travel path for the light emitted by illuminator 305, the color filter 330 is positioned in-between illuminator 305 and photodiode 340.

Each of the multiple color filters passes a corresponding spectrum of light while filtering out other spectrums of light. Consequently, each one of the multiple photodetectors receives spectrally filtered light having passed through at least one of the multiple color filters. By way of example, suppose red, green, and blue light all strike the color filter 330. If color filter 330 is designed to pass only red light, then the red light will be permitted to pass (e.g., as filtered light 335) to strike the photodiode 340 while the green and blue light will be prevented from passing through the color filter 330 and thus prevented from reaching the photodiode 340.

Further discussion on the characteristics of the color filters will be provided later in connection with later figures. As will also be discussed later, in some implementations, at least one of the color filters includes at least one of the following features: i) one or more dielectric coatings disposed on (or stacked on) glass that is positioned adjacent to a corresponding photodetector, or, alternatively, ii) an integrated dielectric material (or stack of multiple dielectric materials) applied directly to the corresponding photodetector.

Figure 3B:
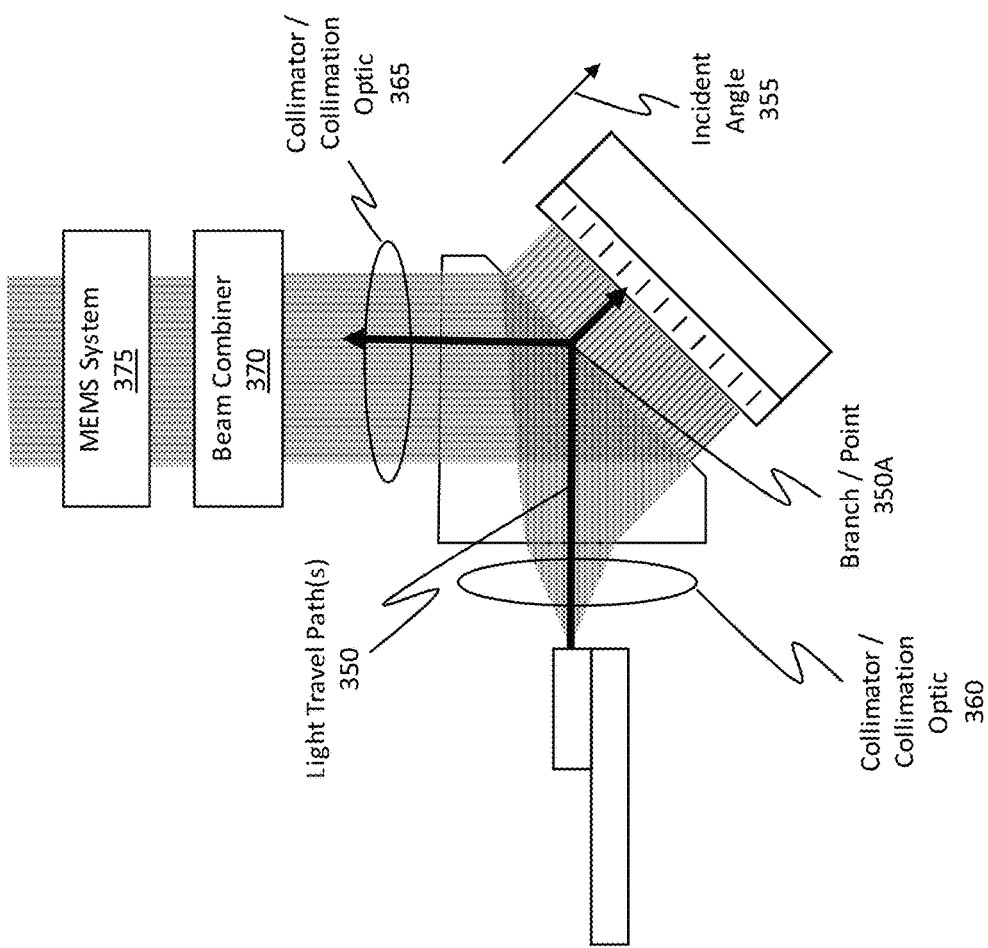
FIG. 3B illustrates an example configuration in which a collimator (or collimation optic), a beam combiner, and a microelectromechanical scanning ("MEMS") mirror system can each be positioned at different locations relative to the travel path of the laser light and relative to the MPD.

FIG. 3B shows another possible configuration for an ultra-compact illumination module 300B, which may have characteristics similar to that of the ultra-compact illumination module 300A of FIG. 3A. In particular, ultra-compact illumination module 300B is shown as including one or more additional optical elements, which can be used to optically adjust the light emitted by the illuminator.

Initially, FIG. 3B shows how light can be emitted from an illuminator in a particular direction so as to follow one or more light travel path(s) 350 (e.g., from the illuminator to a reflective prism). In some embodiments, prior to the light reaching the reflective prism (relative to the light travel path(s) 350), the light is collimated using a collimator/collimation optic 360.

Once the light enters the reflective prism, then the light travel path(s) 350 can include multiple branches, with one branch leading towards one or more color filter(s) and photodiode(s)/photodetector(s) (e.g., as shown by light being reflected at an incident angle 355) and with another branch leading towards another exit of the reflective prism. Any number of branches may be provided by the reflective prism.

When the light leaves the other exit of the reflective prism, in some embodiments, a collimator/collimation optic 365 can be positioned within the light travel path(s) 350 to collimate the exiting light. It should be noted that typically (though not required) only a single collimation optic is positioned within the light travel path(s) 350. That is, if collimator/collimation optic 360 were used, then collimator/collimation optic 365 will not be present. Likewise, if collimator/collimation optic 365 were used, then collimator/collimation optic 360 will not be present.

In some embodiments, a single collimator simultaneously collimates light from multiple illuminators. For instance, collimator/collimation optic 360 can simultaneously collimate light from any number of illuminators. In some cases, a single collimation optic collimates multiple spectrums of light, such as red light, green light, and blue light.

In some embodiments, multiple individual collimators may be used to collimate individual spectrums of light. For instance, one collimator can collimate red light, another collimator can collimate green light, and yet another collimator can collimate blue light. In a preferred embodiment, however, only a single collimator is used to simultaneously collimate red, green, and blue laser light.

Accordingly, light paths (e.g., light travel path(s) 350) originating at one or more illuminators define directions of travel for at least one (and potentially multiple) spectrums of light emitted from one or more illuminators. In some cases, one or more collimating optic(s) are positioned within the light paths subsequent to a point (e.g., branch/point 350A) where the different spectrums of light are directed towards one or more photodetectors relative to the directions of travel. For instance, the aforementioned "point" (e.g., branch/point 350A) occurs within the reflective prism at the branch location. In some cases, the collimator(s) can be positioned after that point or branch (e.g., branch/point 350A). In some cases, a single collimating optic is positioned within the light travel path(s) 350 prior to any photodetectors, relative to the directions of travel. Or rather, the single collimating optic is positioned prior to the aforementioned "point" or branch within the reflective prism.

Ultra-compact illumination module 300B is also shown as including a beam combiner 370 positioned within the light travel path(s) 350. In the scenario shown in FIG. 3B, the beam combiner 370 is positioned subsequent to, or downstream of, the branching point of the reflective prism, but in other embodiments the beam combiner 370 can be positioned upstream to, or prior to, the branching point of the reflective prism. In some cases, the beam combiner 370 is positioned along the light travel path(s) 350 subsequent to, or downstream of, a collimation optic (e.g., collimator/collimating optics 360 and 365). The beam combiner 370 spatially, geometrically, spectrally, or optically combines different spectrums of light emitted by the multiple different illuminators so as to form a single beam of light.

FIG. 3B also shows how a MEMS system 375, which can be configured similarly to MEMS system 140 of FIG. 1, is positioned within the light travel path(s) 350 subsequent to the branch point within the reflective prism (i.e. a point where one or more different spectrums of light are branched, directed, or leaked towards one or more photodetectors while other light is branched towards a different exit of the reflective prism).

Figure 3C:
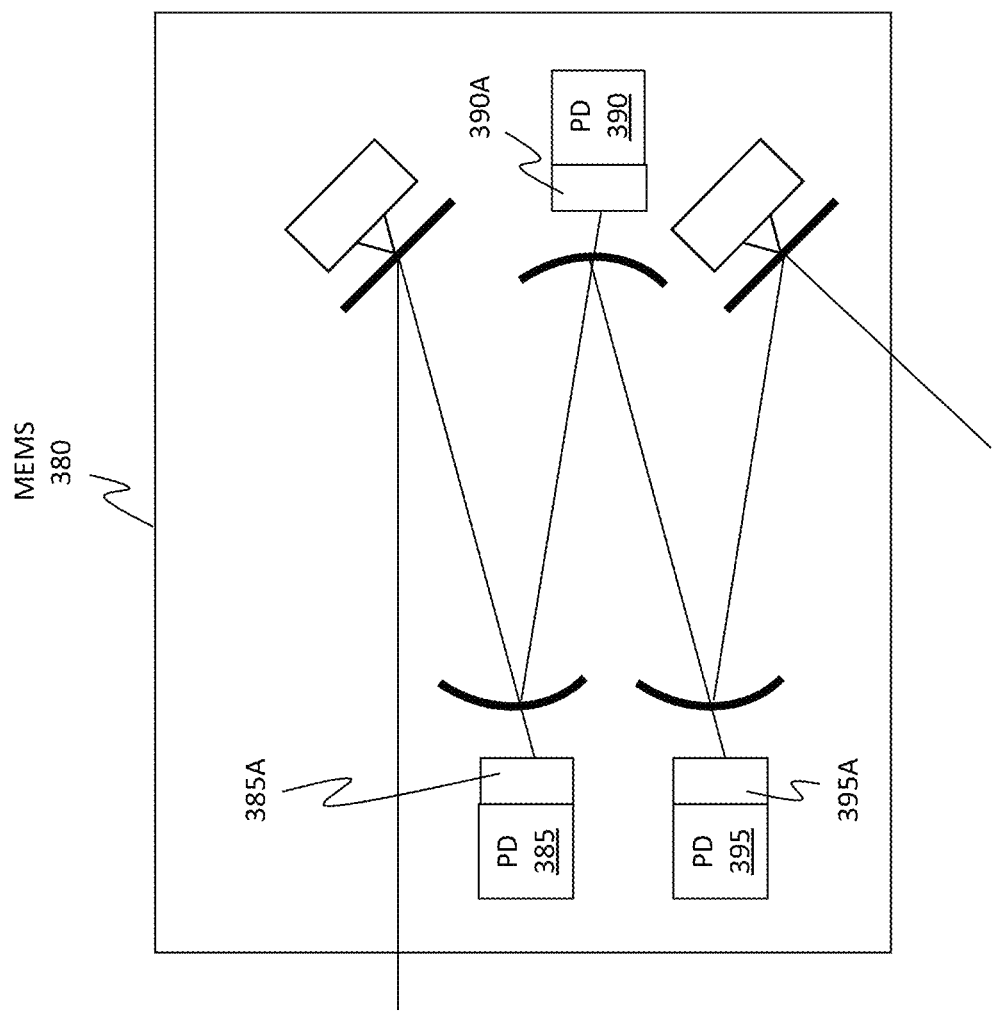
FIG. 3C illustrates another scenario where one or more MPDs can be positioned at different locations within the travel path of laser light relative to the mirror units, or relay optics, of the MEMS system.

FIG. 3C shows another MEMS system 380, which can operate in a manner similar to the MEMS system 375 of FIG. 3B. While FIG. 3B shows one example placement of a color filter and photodetector, FIG. 3C shows additional optional placements for a color filter and corresponding photodetector.

In one optional configuration, a photodetector 385 and corresponding color filter 385A can be positioned at a redirecting mirror (i.e. a relay optic) immediately subsequent to the MEMS system 380's fast scan unit. In another optional configuration, a photodetector 390 and color filter 390A combination can be positioned later on at a subsequent redirecting mirror. In yet another optional configuration, a photodetector 395 and color filter 395A can be positioned off of a redirecting mirror immediately prior to the MEMS system 380's slow scan unit. Accordingly, from this disclosure, it will be appreciated that photodetectors and color filters can be positioned at multiple different optional locations within an illumination system.

Laser Characteristics

Figure 4:
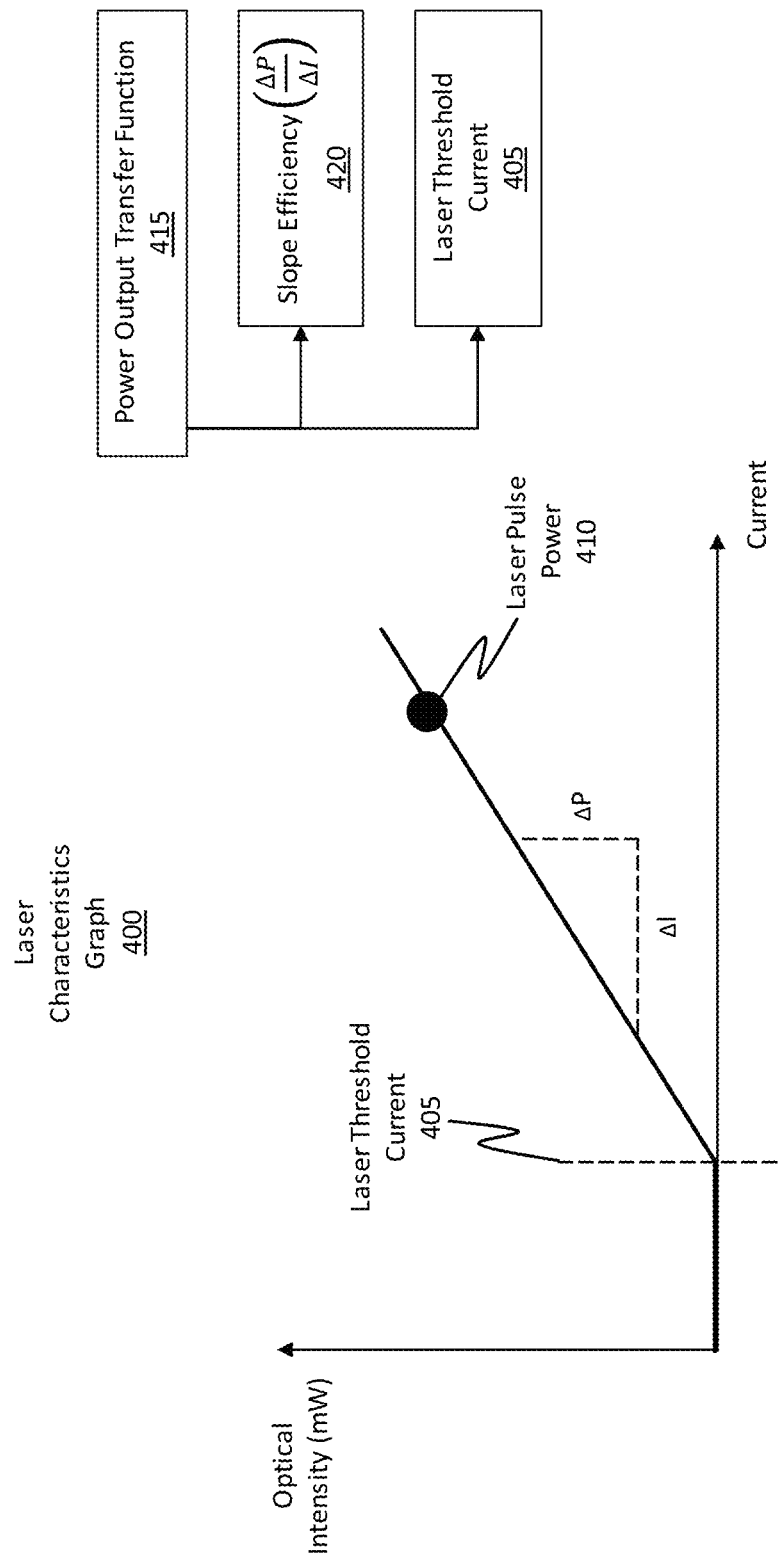
FIG. 4 illustrates some of the power versus current characteristics of a laser/illuminator.

Having just described some physical configurations for the different photodiodes and color filters, attention will now be directed to FIG. 4, which shows some characteristics of a laser/illuminator.

Laser devices (i.e. illuminators) have a gain section over at least a part of the length of the laser device. Moreover, there is a resonant cavity that is defined by the laser structure, spanning the length of the device. When current is injected into this type of device, spontaneously emitted photons are generated. Some of the spontaneously emitted photons are successfully coupled to the laser device's resonant cavity. Afterwards, because the laser device is biased above its "laser threshold" (or "laser current threshold") the photon density starts to increase inside the resonant cavity and eventually a pulse of laser light will be emitted from the laser device.

The intensity of this pulse of laser light is the peak power multiplied by the amount of time the laser device is turned on. As an example, consider an 80 mW peak power that lasts for 4 nanoseconds. The resulting intensity will be 120 pico-Joules for that pulse of laser light.

FIG. 4 shows a laser characteristics graph 400 showing the functional relationship between optical intensity/power (in mW) to current. On laser characteristics graph 400, there is a point, referred to as the laser current threshold 405, where the laser will begin to lase. If this laser current threshold 405 is not satisfied (as shown by the left-hand side of laser characteristics graph 400), then the laser will not lase (i.e. 0 mW of optical intensity).

On the other hand, if the current levels satisfy the laser current threshold 405, then the device will begin to lase. Laser characteristics graph 400 also shows an example laser pulse power 410 that may be used to illuminate a particular pixel. It will be appreciated that the laser pulse power 410 may be different for each pixel, depending on the desired characteristics of the corresponding virtual image.

Laser diodes have a current-in to light-out transfer function, as shown by power output transfer function 415. There are two primary aspects that impact the power output transfer function 415, namely, the laser's slope efficiency 420 (defined as the relationship between ΔP and ΔI) and the laser's laser current threshold 405. Typically, both the slope efficiency 420 and the laser current threshold 405 are functions of the laser device's operating temperature. The output optical power (and hence the intensity of the light emitted by the laser) is based on the power output transfer function 415. As such, it is highly desirable to be able to accurately determine both the slope efficiency 420 and the laser current threshold 405. These determinations are performed using the photodiodes mentioned before. If, however, contamination occurs between different photodiodes (e.g., an MPD for a red laser picks up or responds to some light emitted from a green laser), then crosstalk occurs and a particular photodiode (i.e. MPD) will generate a false or inaccurate measurement for its corresponding laser/illuminator. As such, some of the disclosed embodiments rely on the use of color filters to effectively remove light that may be leaking across to a different photodetector.

Color Filter Characteristics

Figure 5A:
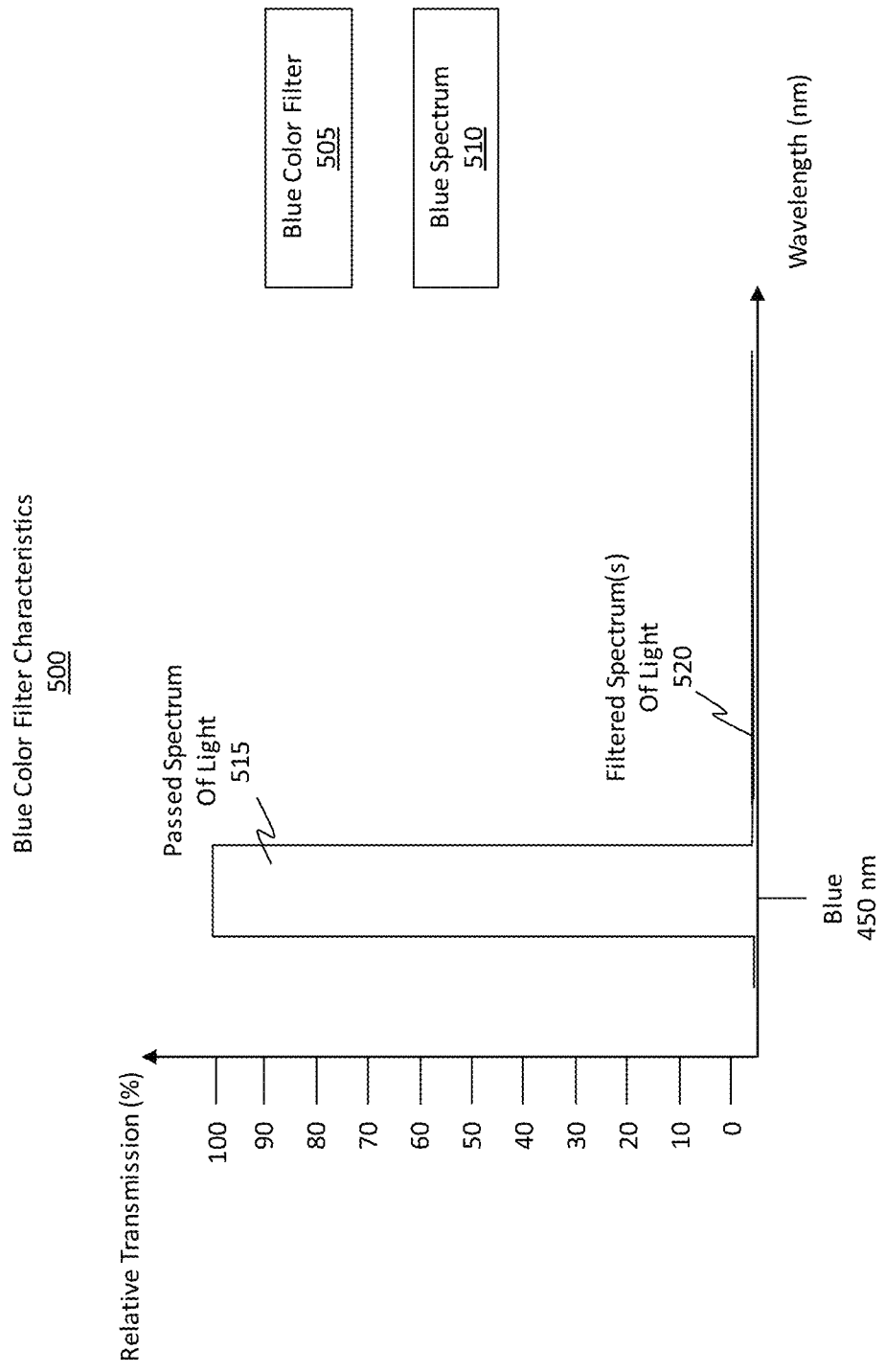
FIGS. 5A, 5B, and 5C illustrate how color filters can filter out different spectrums of light.
Figure 5B:
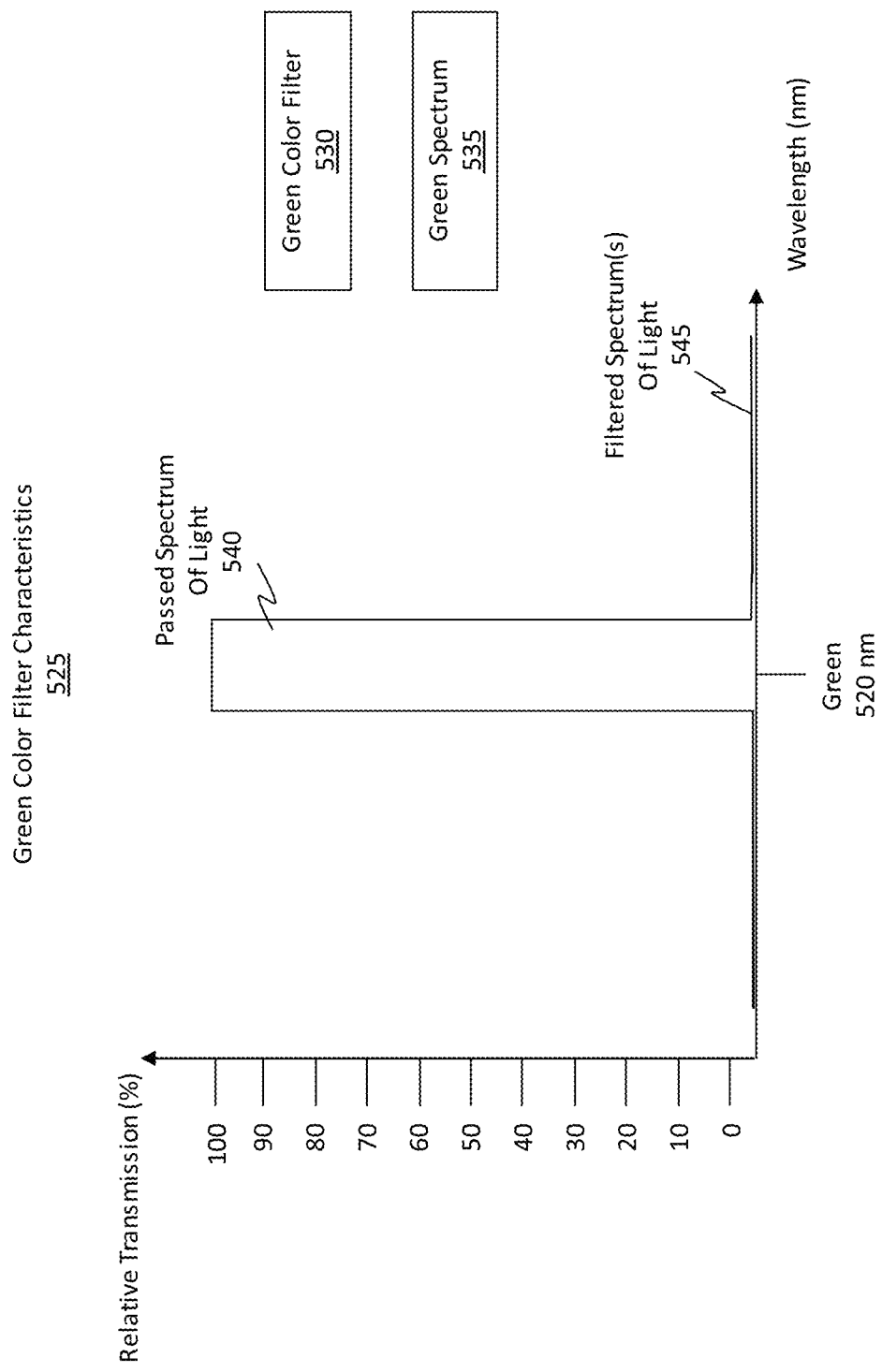
Figure 5C:
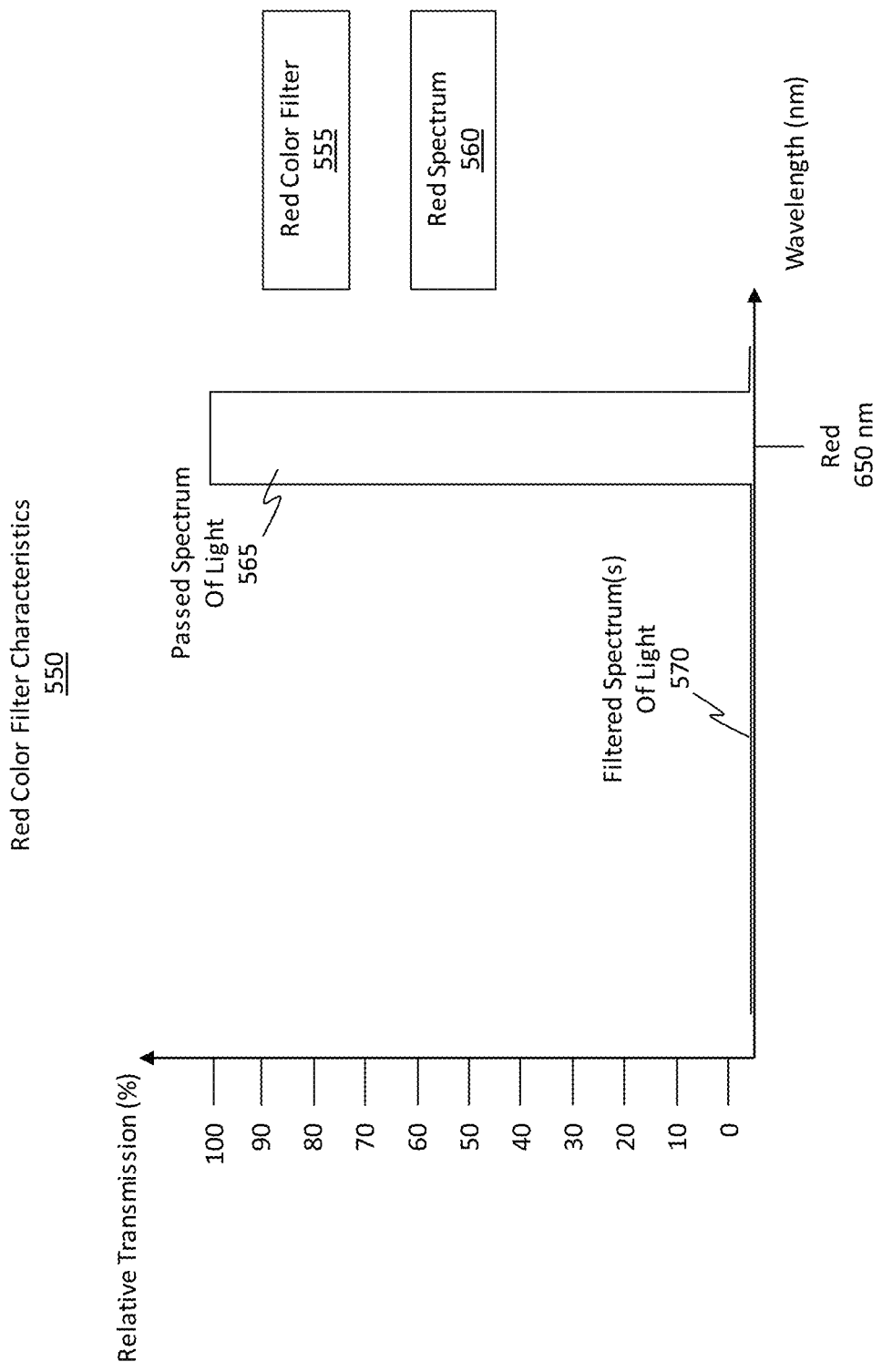

FIGS. 5A, 5B, and 5C show some optical characteristics of the color filters used herein. As described earlier, each illuminator is associated with a corresponding photodetector. For instance, a red illuminator may be associated with a first photodetector, a green illuminator may be associated with a second photodetector, and a blue illuminator may be associated with a third photodetector. The first photodetector is associated with a red color filter that is configured to spectrally filter out non-red spectrums of light, thus allowing red light to pass through the red color filter and be detected by the first photodetector. Similarly, a green color filter filters out non-green light, thus allowing green light to pass through the green color filter and be detected by the second photodetector; and a blue color filter filters out non-blue light, thus allowing blue light to pass through the blue color filter and be detected by the third photodetector.

Of course, no filter is perfect, and some other light may pass through the filter. As such, when reference is may to filtering out light, it will be appreciated that the filtering may not be 100% perfect filtering. Instead, the filtering may be some value smaller than 100% (e.g., 99.9%, 99.5%, 99%, 98%, 97%, and so on).

FIG. 5A shows blue color filter characteristics 500 associated with a blue color filter 505 and the blue spectrum 510 (e.g., around 450 nanometers (nm)). FIG. 5A shows a graph plotting the relationship between relative transmission (%) and wavelength (nm). The blue color filter 505 is designed to allow the blue spectrum 510 (e.g., light having a wavelength around 450 nm) to pass through it, as shown by passed spectrum of light 515, which nears 100% (but, as described earlier, may not actually be perfect 100%). Similarly, the blue color filter 505 filters out other spectrums of light, as shown by the filtered spectrum(s) of light 520 whose relative transmission levels near 0% (but may not actually reach a true 0% value). Accordingly, the blue color filter 505 can be associated with a blue laser/illuminator, and can be positioned in-between the blue laser and a photodetector used to determine the blue laser's output optical power. Because the blue color filter 505 filters out other spectrums of light, the crosstalk consequences of overlapping light can be reduced or eliminated almost in its entirety.

FIG. 5B shows a similar scenario as FIG. 5A, but with a green color filter. In particular, FIG. 5B shows green color filter characteristics 525 associated with a green color filter 530 and the green spectrum 535 (e.g., around 520 nm). Here, the green color filter 530 allows the passed spectrum of light 540 to pass through it while preventing or filtering the filtered spectrum(s) of light 545 from striking a photodetector used to measure the output optical power for a green laser diode.

FIG. 5C shows another similar scenario, but with a red color filter. In particular, FIG. 5C shows red color filter characteristics 550 associated with a red color filter 555 and the red spectrum 560 (e.g., around 650 nm). Here, the red color filter 555 allows the passed spectrum of light 565 to pass through it while preventing or filtering the filtered spectrum(s) of light 570 from striking a photodetector used to measure the output optical power for a red laser diode.

As shown in FIGS. 5A, 5B, and 5C, there are some so-called "tails" to the plotted values. That is, the filtered spectrum(s) of light (e.g., 520, 545, and 570) are shown as being tails having relative transmission values approaching 0%, but that may not actually be 0%. These tails may also contribute to crosstalk factors described herein. That is, these Figures illustrate how color filters may not have perfect filtering characteristics, thus some light may still contaminate, leak, or otherwise permeate to other photodetectors, thus causing some amount of crosstalk.

Photodetector And Color Filter Characteristics

Figure 6A:
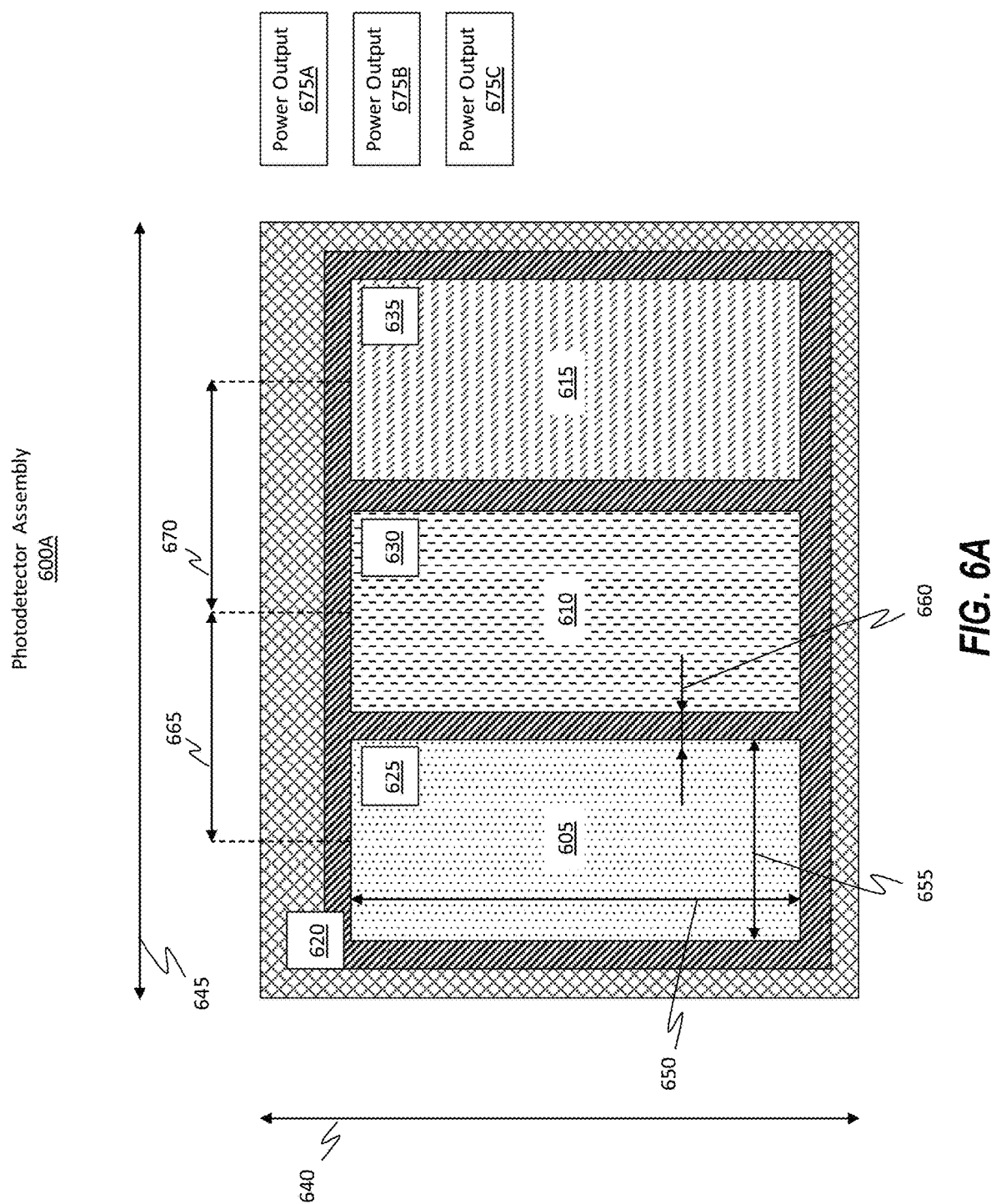
FIG. 6A illustrates how MPDs can be used to detect photons of light emitted by lasers. These MPDs are used to determine and influence the power output of the illuminators/lasers.

FIG. 6A shows an assembly of multiple photodetectors (i.e. photodetector assembly 600A), which includes photodetector 605 (e.g., perhaps used to determine output optical power for a red laser), photodetector 610 (e.g., perhaps used to determine output optical power for a green laser), and photodetector 615 (e.g., perhaps used to determine output optical power for a blue laser). The photodetector assembly 600A can be included or integrated as a part of any of the illumination modules discussed earlier. Furthermore, the photodiode 340 from FIG. 3A can be considered to be one of the photodetectors 605, 610, or 615. It will be appreciated that these photodetectors can all be located on the same chip or wafer or, alternatively, can be included on separate chips and can be positioned proximate to one another.

The photodetector assembly 600A can include a common cathode pad 620 linking the different photodetectors 605, 610, and 615 together. Each respective photodetector can include its own corresponding anode pad. For instance, photodetector 605 is associated with anode pad 625, photodetector 610 is associated with anode pad 630, and photodetector 615 is associated with anode pad 635. The photodetectors 605, 610, and 615 can be reverse biased to sample incident laser light.

The dimensions of the photodetector assembly 600A can be set to any designed value. For instance, the length 640 of the photodetector assembly 600A can be between 0.5 mm and 3 mm, with a preferred value of around 1.0 mm. The width 645 of the photodetector assembly 600A can be between 0.9 mm and 1.5 mm, with a preferred value of around 1.2 mm.

The lengths (e.g., length 650) of the photodetectors 605, 610, and 615 can vary within the range of 0.5 mm and 1.0 mm, with a preferred value being around 0.75 mm. Similarly, the widths (e.g., width 655) of the photodetectors 605, 610, and 615 can vary within the range of 0.2 mm to 0.4 mm, with a preferred value being around 0.3 mm. The distance (e.g., distance 660) between any adjacent photodetector (e.g., photodetector 605 and 610) can vary within the range of 0.02 mm and 0.08 mm, with a preferred value being about 0.05 mm. Similarly, the pitch (e.g., pitch 665 or pitch 670) between the central axis of any two adjacent photodetectors can vary within the range of 0.2 mm and 2.0 mm, or 0.2 mm and 1.0 mm, or 0.3 mm and 0.4 mm, with a preferred value of about 0.35 mm. In this regard, the pitch distances between any two adjacent illuminators are set to compact values of less than about 2.0 mm or perhaps even less than 1.0 mm.

Photodetector 605 can be used to determine the power output 675A of a first illuminator (e.g., a red laser). Similarly, photodetector 610 can be used to determine the power output 675B of a second illuminator (e.g., a green laser), and photodetector 615 can be used to determine the power output 675C of a third illuminator (e.g., a blue laser).

Figure 6B:
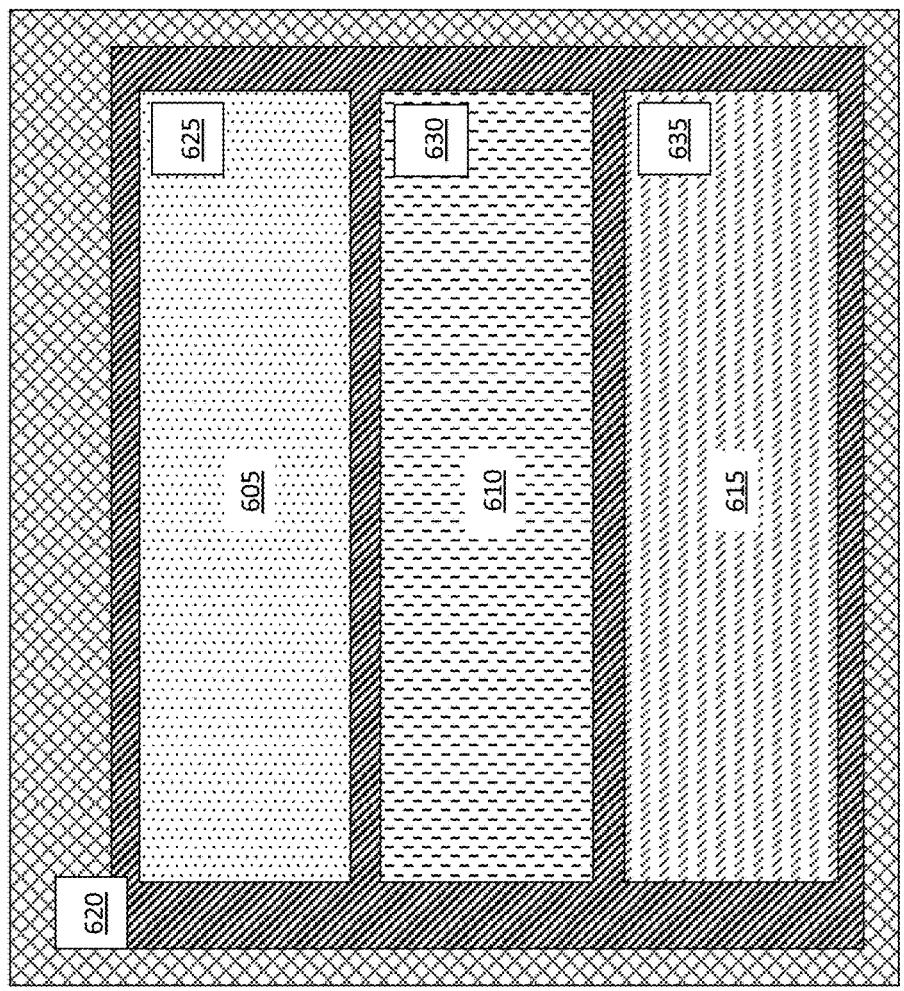
FIG. 6B illustrates another example configuration/orientation for the MPDs.

While FIG. 6A showed one example layout or configuration of the photodetectors (e.g., a vertical arrangement), FIG. 6B shows another layout of a photodetector assembly 600B. In particular, this layout has the photodetectors arranged in a horizontal or lateral configuration while still maintaining the common cathode pad and multiple distinct anode pads.

Figure 6C:
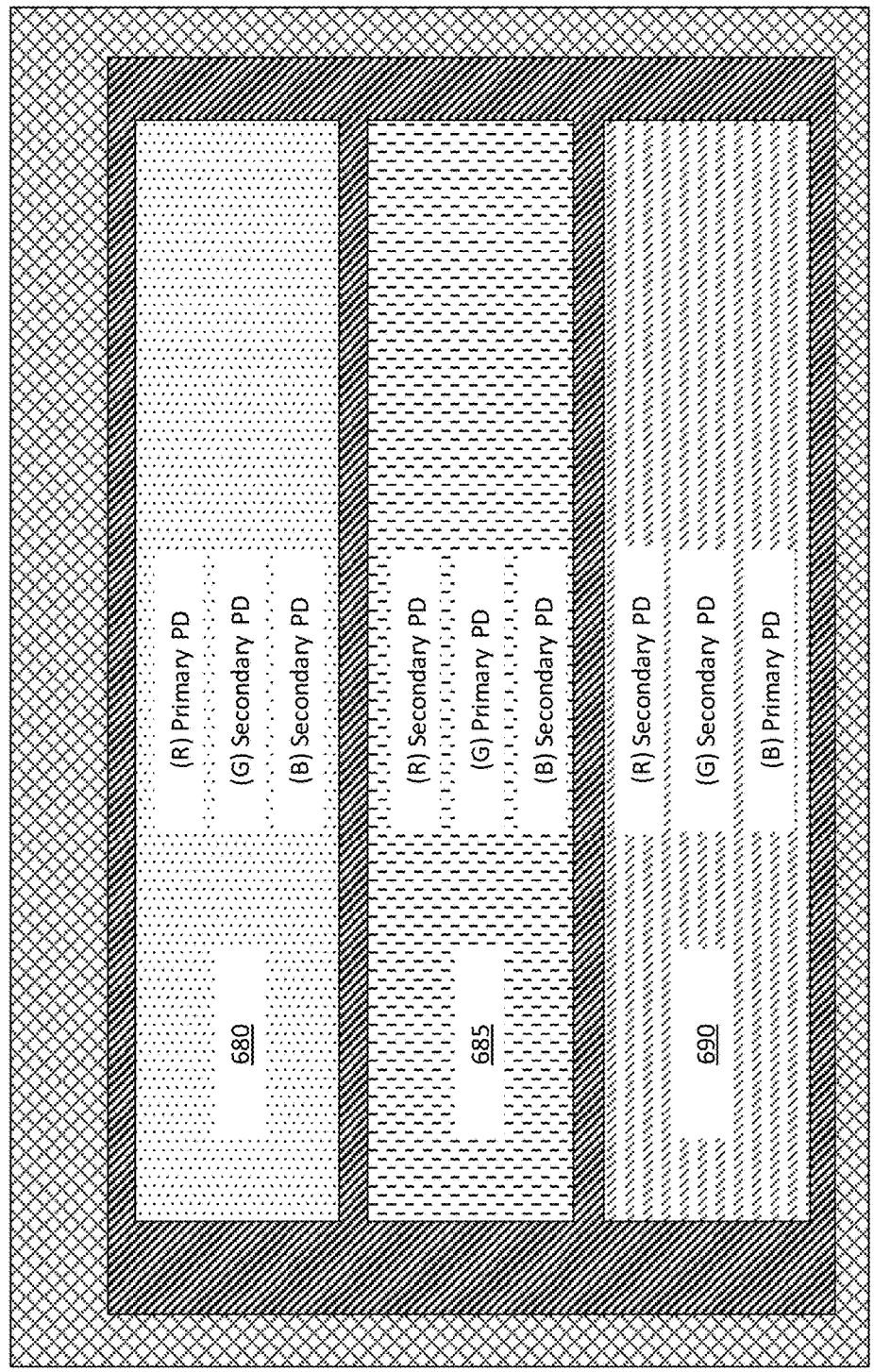
FIG. 6C illustrates how an MPD can operate both as a primary and as a secondary MPD for a laser.

FIG. 6C shows a scenario showing primary & secondary photodetector(s), as shown by photodetector assembly 600C. For instance, there is shown a first photodetector 680, corresponding to photodetector 605 from FIGS. 6A and 6B, photodetector 685, corresponding to photodetector 610, and photodetector 690, corresponding to photodetector 615.

Photodetector 680 is considered to be a "primary" photodetector for detecting red laser light, photodetector 685 is considered to be a "primary" photodetector for detecting green laser light, and photodetector 690 is considered to be a "primary" photodetector for detecting blue laser light. Unfortunately, light often streaks or leaks to other sections of the housing and may be picked up or detected by other photodiodes. For instance, whereas the "red" photodetector is provided to measure the power output of the red laser diode, in some cases green light may unintentionally leak over and be detected by the red photodetector (thus leading to optical crosstalk). To clarify, in situations involving crosstalk (even when a color filter is used, because color filters may not be 100% perfect in their filtering), some crosstalk may occur. For instance, some red laser light may leak over and be detected by either the photodetector 685 and/or the photodetector 690, even though only photodetector 680 is supposed to detect red laser light. Similarly, some green laser light may leak over and be detected by either the photodetector 680 and/or the photodetector 690, even though only photodetector 685 is supposed to detect green laser light. Similarly, some blue laser light may leak over and be detected by either the photodetector 680 and/or the photodetector 685, even though only photodetector 690 is supposed to detect blue laser light.

In this sense, and as will be discussed in more detail later, photodetector 680 can be considered as a "different" or "secondary" photodetector for detecting green laser light and/or blue laser light. Similarly, photodetector 685 can be considered as a "different" or "secondary" photodetector for detecting red laser light and/or blue laser light, and photodetector 690 can be considered as a "different" or "secondary" photodetector for detecting red laser light and green laser light. Further discussion on this aspect will be provided later in connection with the other technique for compensating for crosstalk, beginning at the section named "Using Programmatic Adjustments To Compensate For Crosstalk."

FIGS. 6A, 6B, and 6C showed some properties of the photodetectors. In contrast, FIGS. 7, 8A, 8B, 8C, 8D, 8E, 9A, and 9B show properties of the color filters, which can be overlaid immediately on top of or proximate to the photodetectors (and hence providing essentially no physical separation or gap between the two units) or which can be disposed some small distance above the photodetectors (thereby allowing a small gap). This gap can be designed to be small (e.g., less than 0.5 mm). In a preferred embodiment, there is no gap.

Figure 7:
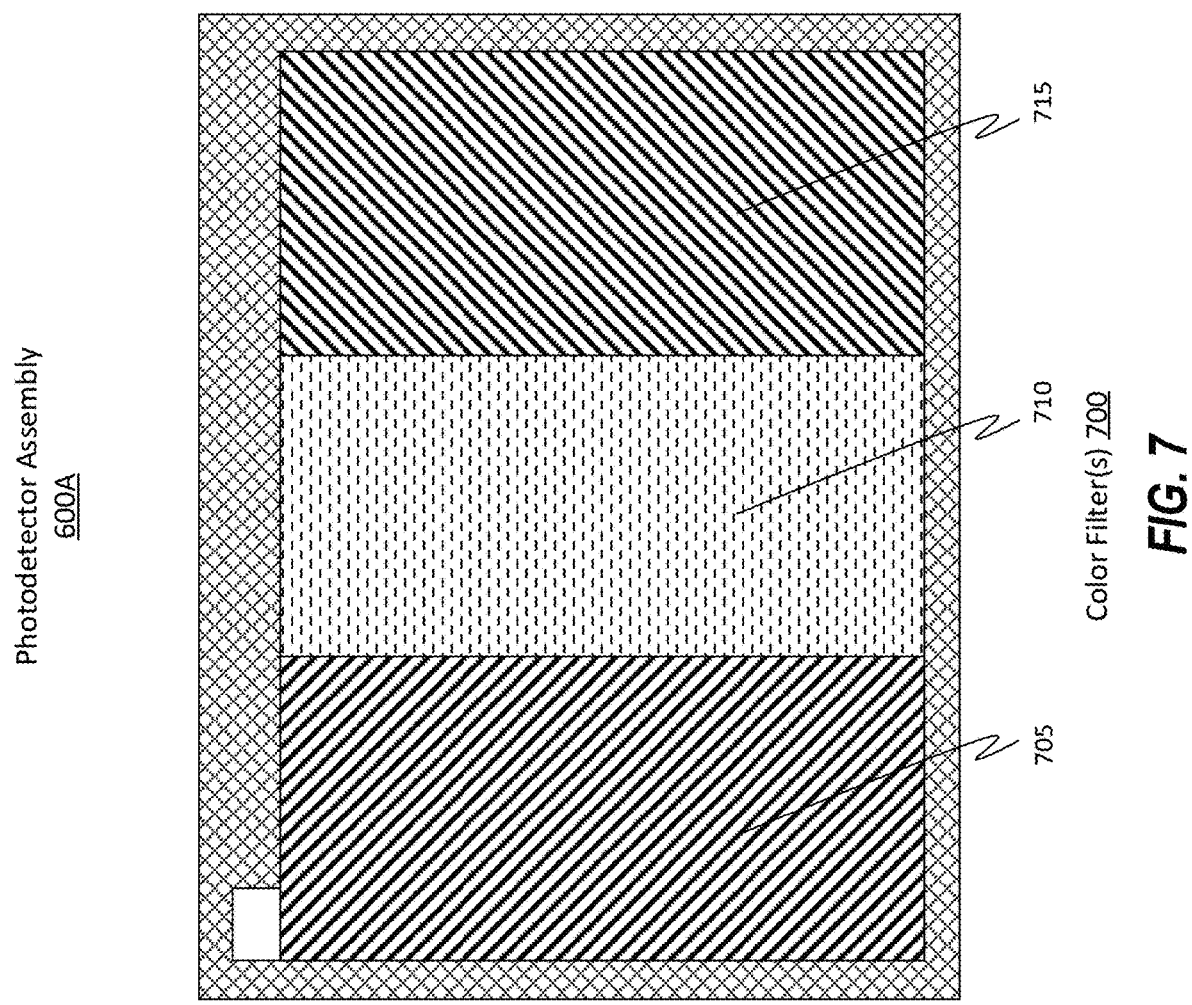
FIG. 7 illustrates how color filters can be disposed proximately (e.g., overtop) of the MPDs in order to filter out light prior to the light reaching the underlying MPDs.

Turning now to FIG. 7, there is shown a number of color filter(s) 700, including color filter 705, color filter 710, and color filter 715. With reference to FIG. 6A, color filter 705 is disposed overtop of photodetector 605 and may cover an entirety of the photodetector 605 (i.e. the entire surface area of the photodetector 605 is covered by color filter 705). As such, the dimensions of color filter 705 may be substantially the same as the dimensions of the photodetector 605. Alternatively, the dimensions or surface area may be a percentage value larger (e.g., 1%, 2%, 3%, 4%, 5%, and so on) than the dimensions of the photodetector 605. A larger size for the color filter 705 ensures that no undesired light inadvertently leaks through to the photodetector 605 at the edge regions of the color filter 705. Color filter 705 can be used to pass essentially only red light while filtering out other spectrums of light, as described in FIG. 5C, thereby operating effectively as a bandpass filter.

Color filter 710 is disposed overtop of photodetector 610 and can have dimensions similar to that of color filter 705. Furthermore, color filter 710 can be used to pass essentially only green light while filtering out other spectrums of light, as shown in FIG. 5B, thereby operating effectively as a bandpass filter.

Color filter 715 is disposed overtop of photodetector 615 and can have dimensions similar to that of color filters 705 and 710. Furthermore, color filter 715 can be used to pass essentially only blue light while filtering out other spectrums of light, as shown in FIG. 5A, thereby operating effectively as a bandpass filter. As described above, the surface area of a color filter can be the same as the surface area of its underlying photodetector, or, alternatively, the surface area of the color filter can be some percentage value larger (e.g., 0.5%, 1%, 1.5%, 2%, and so on) than the surface area of the underlying photodetector.

Figure 8A:
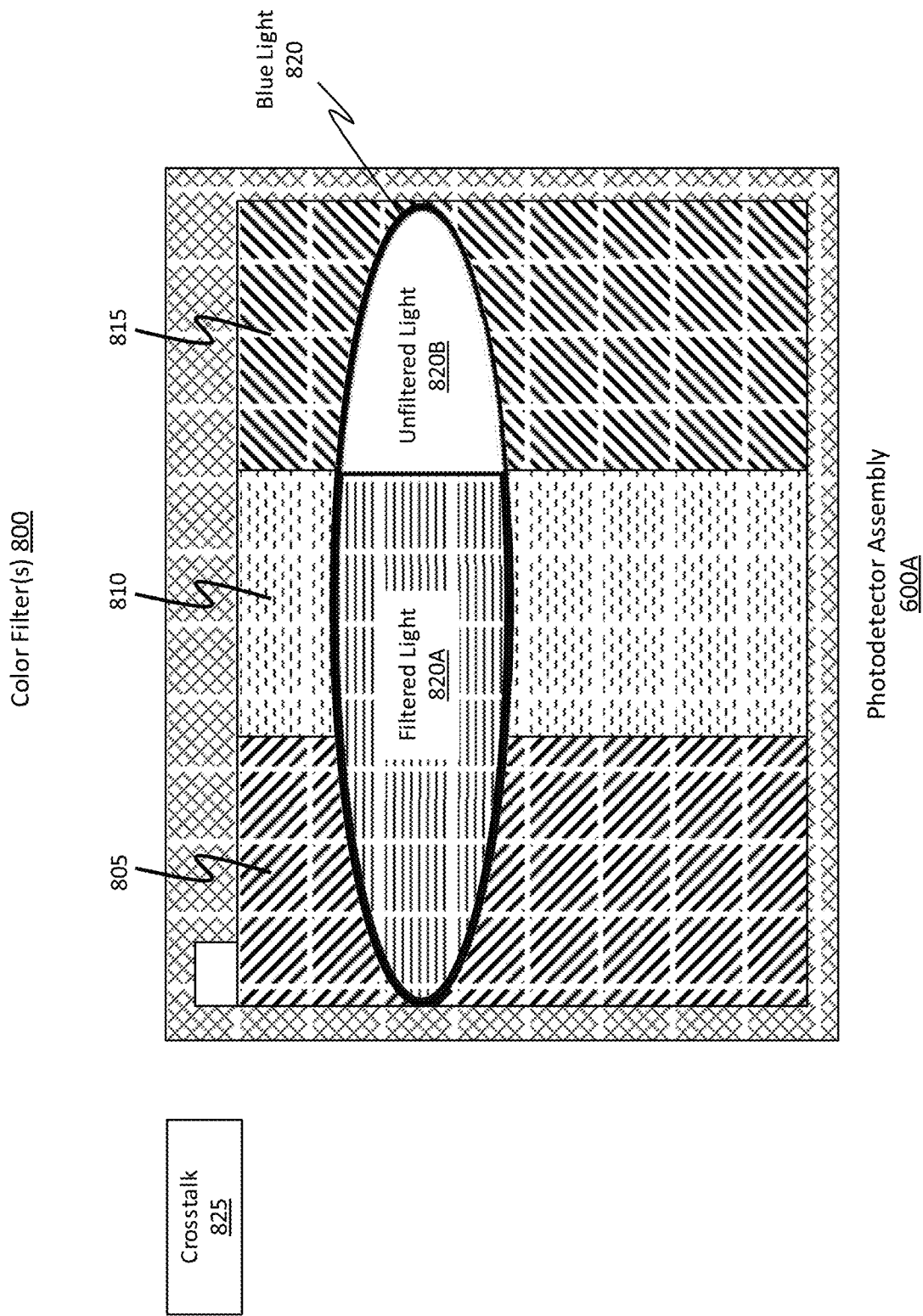
FIGS. 8A, 8B, 8C, and 8D illustrate different scenarios in which light is filtered using the different color filters.

FIGS. 8A, 8B, 8C, 8D, and 8E illustrate specific examples related to the above descriptions. For instance, FIG. 8A shows a set of color filter(s) 800, including a red color filter 805, a green color filter 810, and a blue color filter 815, which are similar to color filters 705, 710, and 715, respectively.

In the scenario shown in FIG. 8A, an emission of blue light 820 is being directed towards the color filters 800 and the underneath photodetectors. For instance, blue light 820 can be representative of leaked light 325 from FIG. 3A, and color filter 330 can be representative of one of the red color filter 805, green color filter 810, or blue color filter 815. Because of the orientation of the view provided in FIG. 8A, however, the underlying photodetectors are not visible.

Here, the red color filter 805 and the green color filter 810 are filtering out the blue light 820, resulting in filtered light 820A being prevented from passing through the red color filter 805 and the green color filter 810 and, thereby, being prevented from striking the underlying red photodetector (i.e. the photodetector used to determine the output optical power of the red illuminator) and the green photodetector. On the other hand, the unfiltered light 820B (which is in the blue laser spectrum) passes through the blue color filter 815 and will strike the underlying blue photodetector. In this scenario, crosstalk 825 is substantially prevented from occurring, even though the blue light 820 is spread or leaked across multiple different areas and is not confined only to the surface area corresponding to the blue photodiode. As will be discussed later, however, some crosstalk may still occur because color filters are not truly perfect filtering devices.

Figure 8B:
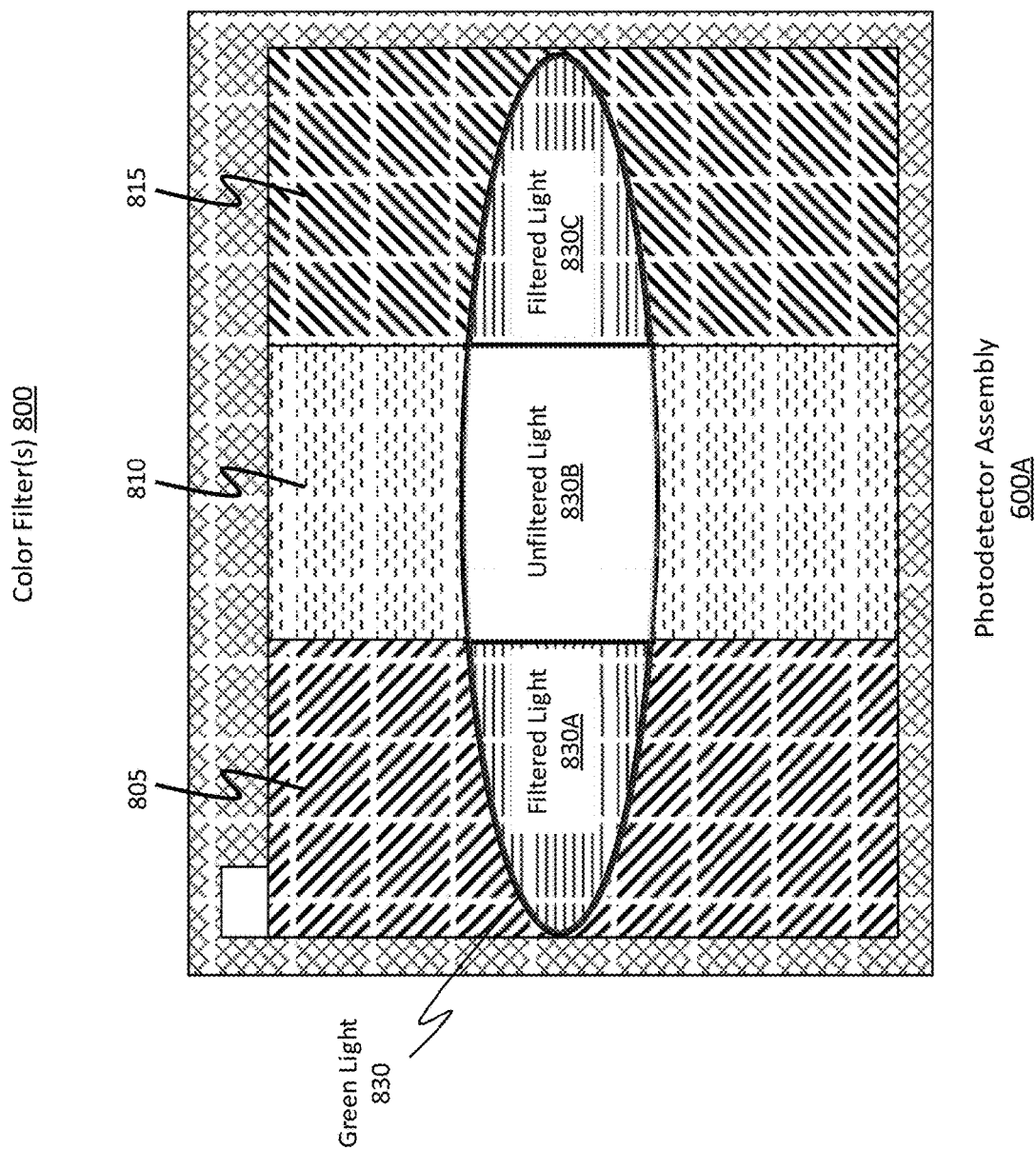

FIG. 8B shows a scenario where only green light 830 is striking the red color filter 805, the green color filter 810, and the blue color filter 815. Here, filtered light 830A is filtered by the red color filter 805, the unfiltered light 830B is permitted to pass through the green color filter 810, and the filtered light 830C is filtered by the blue color filter 815.

Figure 8C:
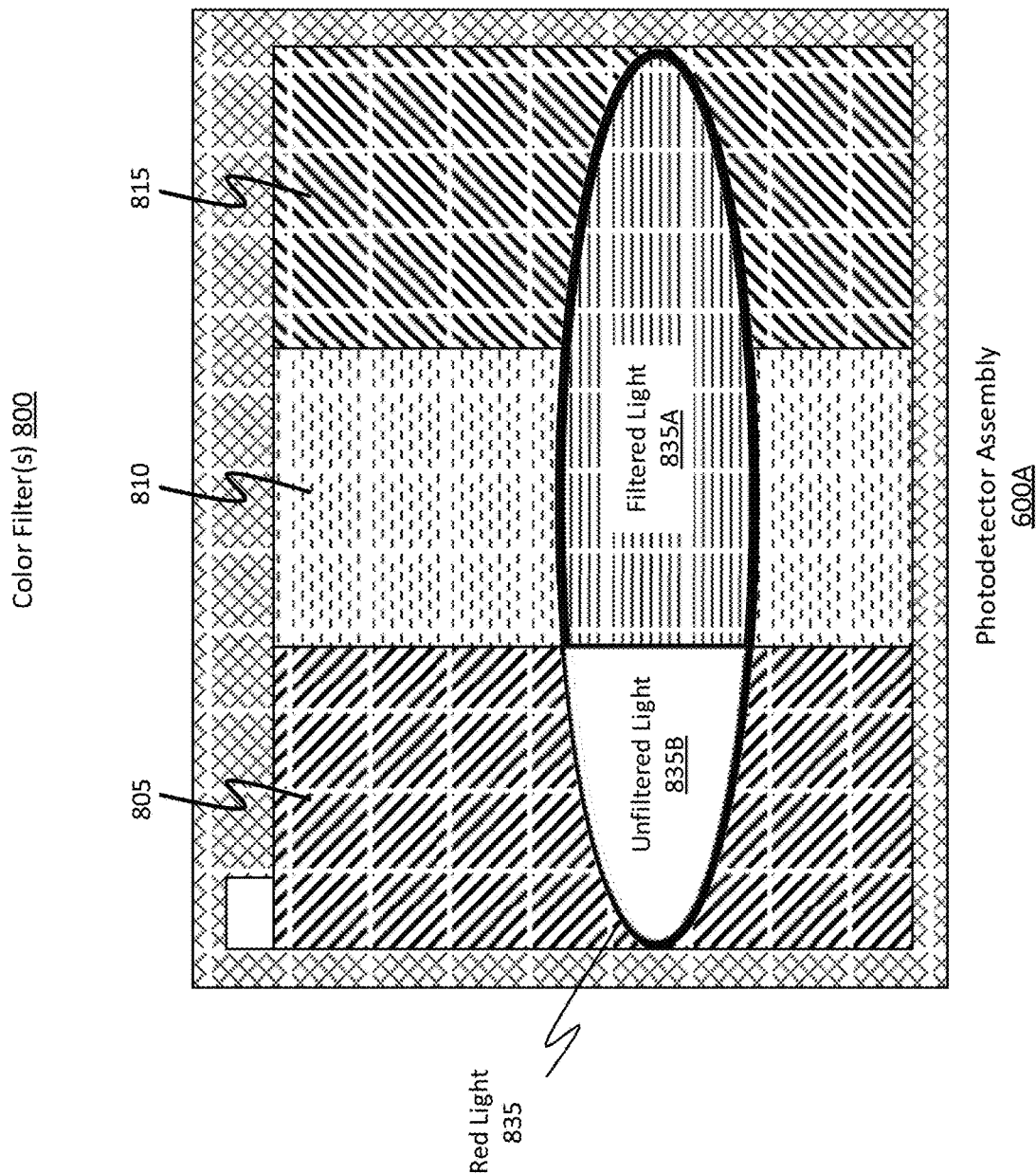

FIG. 8C shows a scenario where only red light 835 is striking the red color filter 805, the green color filter 810, and the blue color filter 815. Here, unfiltered light 835B is permitted to pass through the red color filter 805, and the filtered light 835A is filtered by both the green color filter 810 and the blue color filter 815.

Figure 8D:
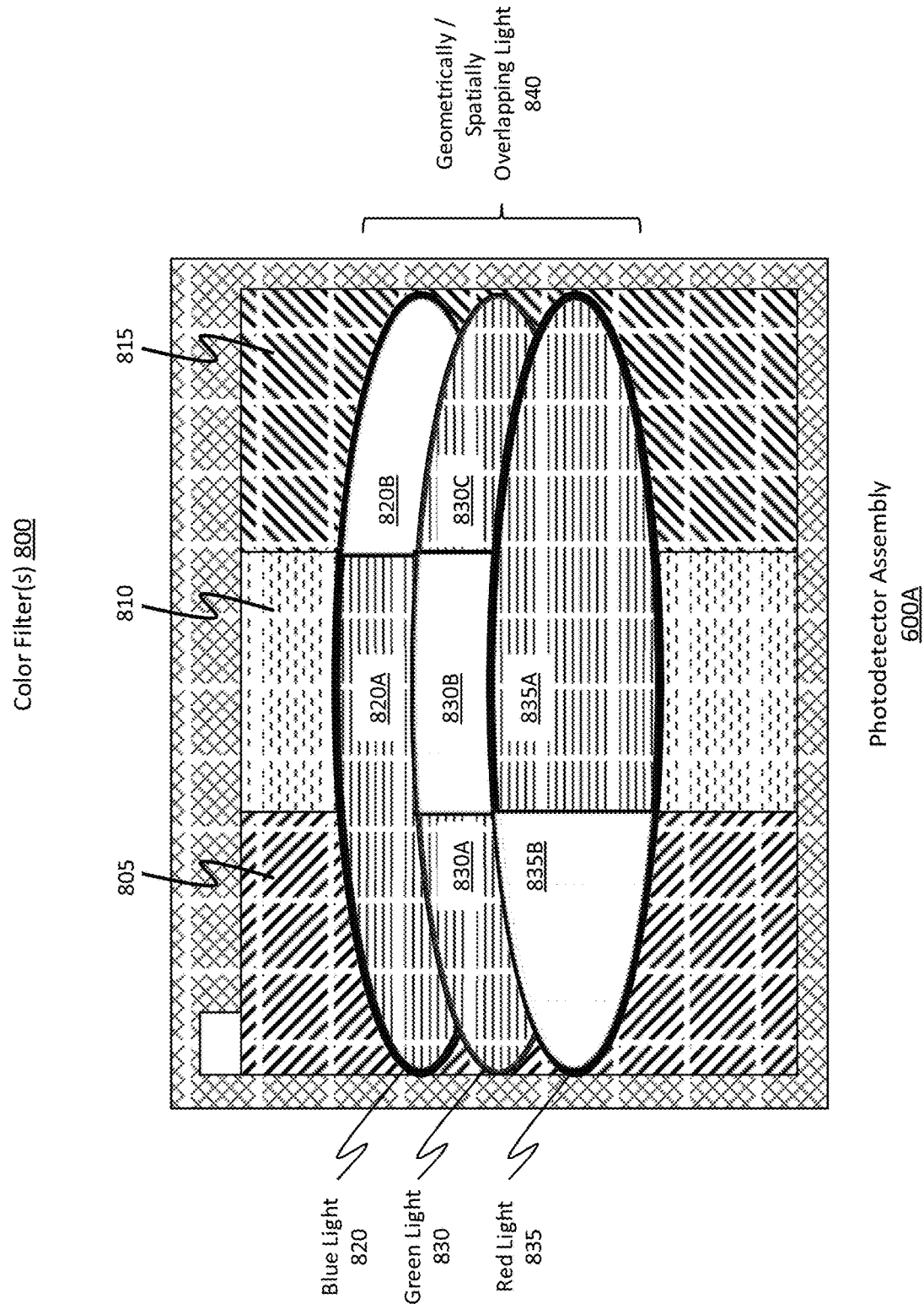

FIG. 8D shows a scenario in which multiple different spectrums of light (e.g., blue light 820, green light 830, and red light 835) are simultaneously striking the red color filter 805, the green color filter 810, and the blue color filter 815. For instance, such a scenario may occur as shown in FIG. 3B where the emitted laser light from multiple different illuminators has not yet been beam combined by a beam combiner and is spreading across multiple different areas within the packaging unit or the ultra-compact illumination module. Even if the beam has been beam combined, the multiple different spectrums can still strike the color filter(s) 800.

Here, the blue light 820 is filtered (e.g., filtered light 820A) by both the red color filter 805 and the green color filter 810 but allowed to pass through the blue color filter 815 as shown by unfiltered light 820B.

The green light 830 is filtered (e.g., filtered light 830A and 830C) by both the red color filter 805 and the blue color filter 815 but allowed to pass through the green color filter 810 as shown by unfiltered light 830B.

The red light 835 is filtered (e.g., filtered light 835A) by both the green color filter 810 and the blue color filter 815 but allowed to pass through the red color filter 805 as shown by unfiltered light 835B.

As shown by FIG. 8D, the different spectrums of light (e.g., blue light 820, green light 830, and red light 835) geometrically/spatially overlap with one another, as shown by the label designated as geometrically/spatially overlapping light 840.

Figure 8E:
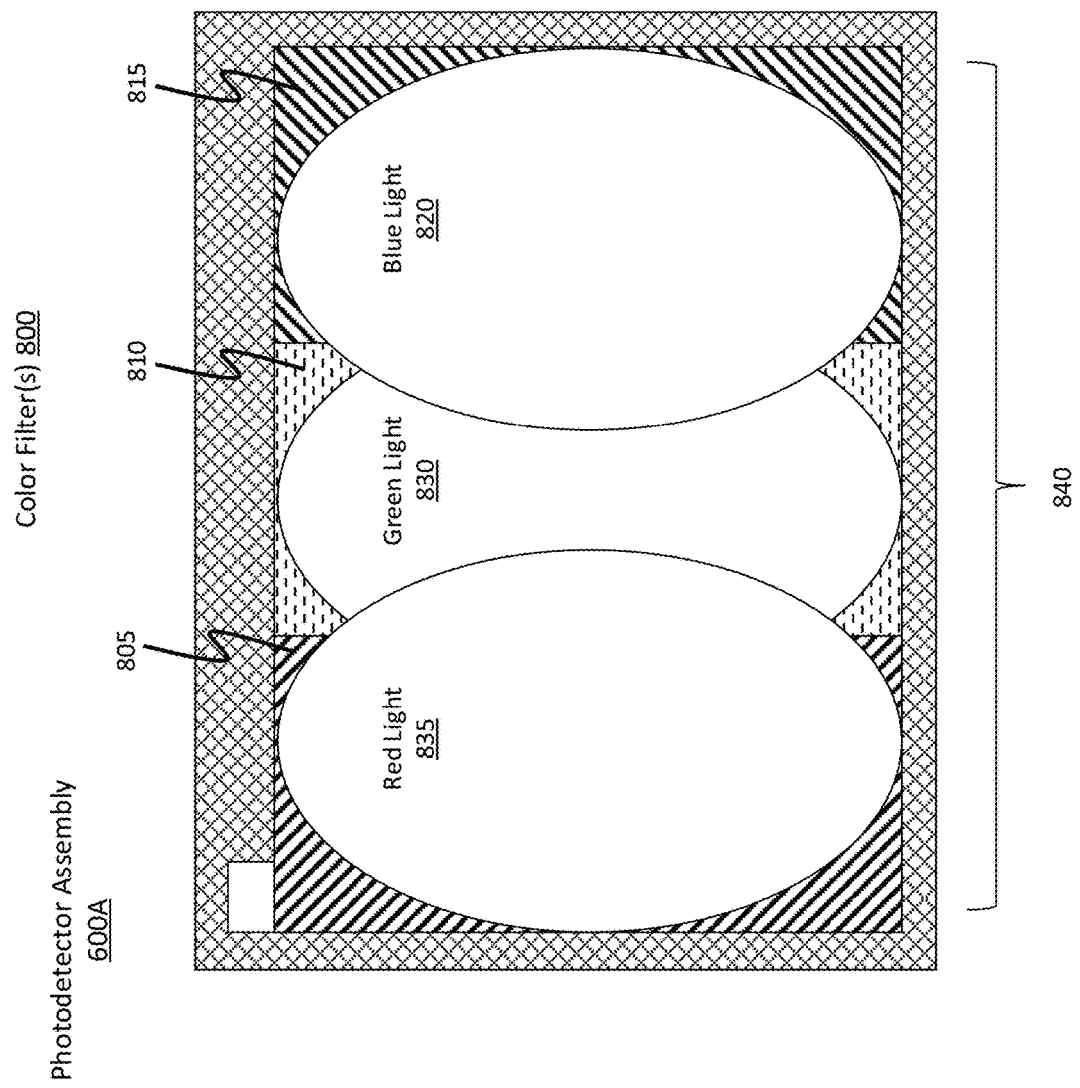
FIG. 8E illustrates another example scenario of how light can be emitted towards the color filters and MPDs.

FIGS. 8A through 8D showed one example scenario regarding how the laser light can strike the different color filters. It will be appreciated that these are not the only orientations or configurations and other striking angles or orientations may be provided. For instance, FIG. 8E shows another configuration in which the red light 835, the green light 830, and the blue light 820 can strike the color filters 805, 810, and 815 at a different orientation. Whereas previous strike orientations were almost evenly dispersed across the three different color filters (e.g., about 33% across each color filter), the scenario shown in FIG. 8E illustrates how a majority of corresponding light can strike only its corresponding color filter.

For instance, the vertical striking orientation causes roughly 80% of the red light 835 to strike the red color filter 805 whereas in FIG. 8D only about 33% of the red light 835 struck the red color filter 805. Similarly, in FIG. 8E, roughly 80% of the green light 830 is striking the green color filter 810, and roughly 80% of the blue light 820 is striking the blue color filter 820, whereas only about 33% of those light portions were striking their corresponding color filters in FIG. 8D. Notwithstanding this other orientation, there is still some amount of overlapping light, as shown by geometrically/spatially overlapping light 840.

Figures 9A, 9B:
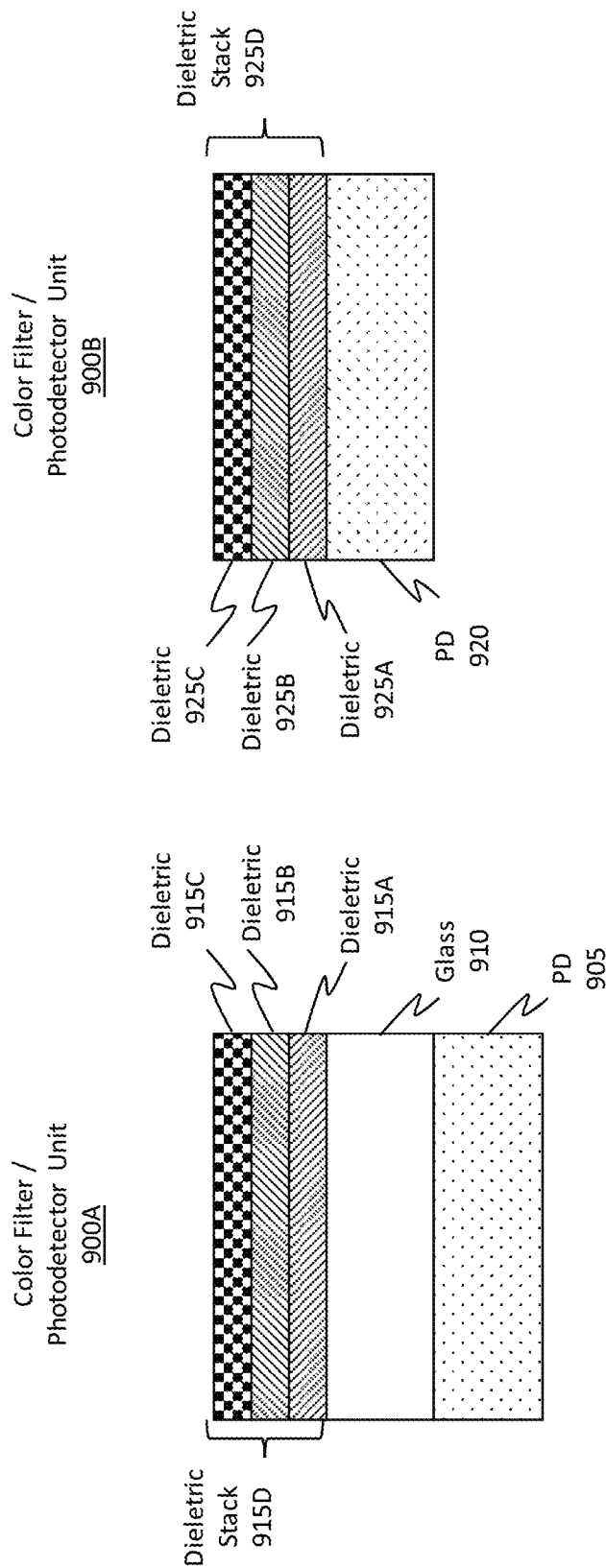
FIGS. 9A and 9B illustrate different configurations for the color filters.

The disclosed color filters can be configured in different ways, as shown in FIGS. 9A and 9B. Specifically, FIG. 9A shows a first type of color filter/photodetector unit 900A while FIG. 9B shows a second type of color filter/photodetector unit 900B.

In the first arrangement, color filter/photodetector unit 900A includes a photodetector (PD) 905 and an overlying glass layer 910. Disposed on (or stacked on) this glass layer 910 is any number of dielectric layers/coatings, such as dielectric layer 915A, dielectric layer 915B, and dielectric layer 915C, the combination of which is included in dielectric stack 915D. While only three dielectric layers are illustrated, it will be appreciated that any number of dielectric layers may be provided (e.g., 10 layers, 20, 30, 40, 50, 60, 70, 80, 90, 100, or potentially even multiple hundreds of layers). These layers enable the color filter, which includes the glass layer 910 and the dielectric layers 915A, 915B, and 915C, to filter out different spectrums of light using their color isolation properties. That is, by covering at least an entire surface area of a corresponding photodetector, a particular color filter can effectively prevent certain spectrums of light from reaching the corresponding photodetector. In this regard, FIG. 9A shows a color filter configuration in which a color filter includes one or more dielectric coatings, skins, or layers disposed, or stacked, on a glass layer 910, which is positioned adjacent to a corresponding photodetector (e.g., PD 905) and which effectively covers the entire surface area of the photodetector.

In contrast, FIG. 9B shows another, alternative example configuration of a color filter, where the color filter includes an integrated dielectric material (or stack of multiple dielectric materials) applied directly to a photodetector. Specifically, FIG. 9B shows a PD 920 and one or more integrated dielectric coatings/layers (e.g., dielectric layers 925A, 925B, and 925C) disposed immediately on top of the PD 920 in the form of dielectric stack 925D. To form this kind of color filter, it is possible to use a physical mask on the silicon wafer having the photodetectors and apply the dielectric coatings directly to the photodetector.

In some embodiments, the orientations of the photodetectors and the color filters relative to the emission directions of light emitted by the illuminators is set to accommodate differing incident angles of the emission directions, as discussed in connection with FIG. 3B. That is, a design of each of the color filters relative to an emission direction of light can be set to accommodate differing incident angles of light striking those color filters. Different incident angles require different numbers of dielectric coatings in each color filter.

To clarify, because of these differing pre-determined incident angles, different types of dielectric material and different numbers of layers of dielectric material can be provided in the color filter to accommodate for the differing incident angles of light emitted by the illuminators. Indeed, the color filters can be designed to accommodate different incident angles, regardless of what those angles may be. Wider angles result in relatively more dielectric layers being used while smaller angles result in relatively fewer dielectric layers being used. Additionally, separate multi-layer dielectric coatings can be provided on each photodetector to accommodate differing spectral characteristics (e.g., to allow red light to pass while preventing other light colors, and so on) as well as to accommodate the differing incident angles of light.

Accordingly, in some embodiments, an ultra-compact module includes a first illuminator that emits a first spectrum of light. A first photodetector is configured to determine the power output for the first illuminator based on detecting at least some of the first spectrum of light.

The module also includes a first color filter positioned between the first illuminator and the first color photodetector. The first color filter filters out spectrums of light different from the first spectrum of light, thereby enabling the first photodetector to avoid detecting spectrums of light different from the first spectrum.

The module also includes a second illuminator that emits a second spectrum of light. A second photodetector is configured to determine a power output for the second illuminator based on detecting at least some of the second spectrum of light.

The module also includes a second color filter positioned between the second illuminator and the second photodetector. The second color filter filters out spectrums of light different from the second spectrum of light.

Additionally, because the pitch distance between the first illuminator and the second illuminator is set to within a predetermined compact range, certain conditions occur. One condition results in some of the second spectrum of light spatially overlapping some of the first spectrum of light received at the first color filter. The first color filter filters out the second spectrum of light so that the second spectrum of light is prevented from reaching the first photodetector.

Another (additional or alternative) condition results in some of the first spectrum of light spatially overlapping some of the second spectrum of light received at the second color filter. The second color filter filters out the first spectrum of light so that the first spectrum of light is prevented from reaching the second photodetector.

In some embodiments, the ultra-compact illumination module further includes a third illuminator that emits a third spectrum of light. A third photodetector may be provided and may be configured to determine a third power output of the third illuminator based on detecting at least a portion of the third spectrum of light.

A third color filter can also be provided and can be positioned between the third illuminator and the third photodetector. The third color filter filters out spectrums of light different from the third spectrum of light such that the third photodetector detects the third spectrum of light and avoids detecting the spectrums of light different from the third spectrum of light.

As a result of a second pitch distance between i) the third illuminator and ii) either one of the first illuminator or the second illuminator also being within the predetermined range, certain additional conditions may occur, as outlined below.

One condition occurs when some of either the first or second spectrum of light spatially overlaps some of the third spectrum of light received at the third color filter. Here, the third color filter filters out at least some of the first or second spectrums of light such that the first or second spectrums of light are prevented from reaching the third photodetector.

Another additional, or alternative, condition occurs when some of the third spectrum of light spatially overlaps some of either the first or second spectrums of light received at either the first or second color filters. Here, the first or second color filters filter out at least some of the third spectrum of light such that the third spectrum of light is prevented from reaching either the first photodetector or the second photodetector. Accordingly, some of the disclosed embodiments are directed to the use and placement of color filters in order to prevent crosstalk or light leakage from occurring across multiple different photodetectors.

Using Programmatic Adjustments to Compensate for Crosstalk

In addition to, or as an alternative to, the processes described above in connection with using the color filters to selectively filter out light so as to avoid crosstalk, some embodiments are also configured to perform one or more programmatic adjustments to compensate for crosstalk between multiple (e.g., at least two, but potentially, 3, 4, 5, 6, 7, etc.) photodetectors. To clarify, as the size of laser modules is reduced and as the monitoring of the devices becomes integrated into the optical train of the display module assembly (i.e. integrated into the same packaging unit), there often arises an optical crosstalk condition between the monitoring devices (i.e. photodetectors) resulting from the overlap of the laser diode colors. This overlap and crosstalk interferes with the accuracy of the photodetectors, and in particular with their laser output power measurements. As modules decrease in size and as optical shielding to the photodetectors is reduced, the crosstalk worsens, resulting in increased optical crosstalk between the red, green, and blue laser channels.

Additionally, some systems using MEMS systems are configured with dual laser emitters. Such dual laser emitters may have substantially different laser current thresholds and slope efficiency values, thereby resulting in very different output power levels. Thus, the laser current threshold and slope efficiency power correction factors are quite different for lasers having dual emitters.

As described earlier, it should also be noted that color filters are typically not perfect. That is, if a color filter is designed to pass only a particular light spectrum through it, it is often the case that some light from one or more other color spectrums will slightly leak through the filter. Stated differently, it is often the case that color filters do not evidence perfect color isolation or filtration. Therefore, even in situations where a color filter is disposed overtop of a monitoring photodetector, there may be situations in which light from one laser source or illuminator permeates, leaks, or otherwise contaminates the readings provided by a photodetector configured to detect light for a separate illuminator. Accordingly, in this and the following sections, various techniques are described to programmatically eliminate the impact of optical crosstalk in order to provide improved optical feedback required for RGB color correction. The following discussion is applicable in numerous scenarios, including, but not limited to, ultra-compact modules with integrated laser illuminators and photodetectors, scenarios involving light scatter across any number of different photodetectors, or any of the other situations disclosed herein.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
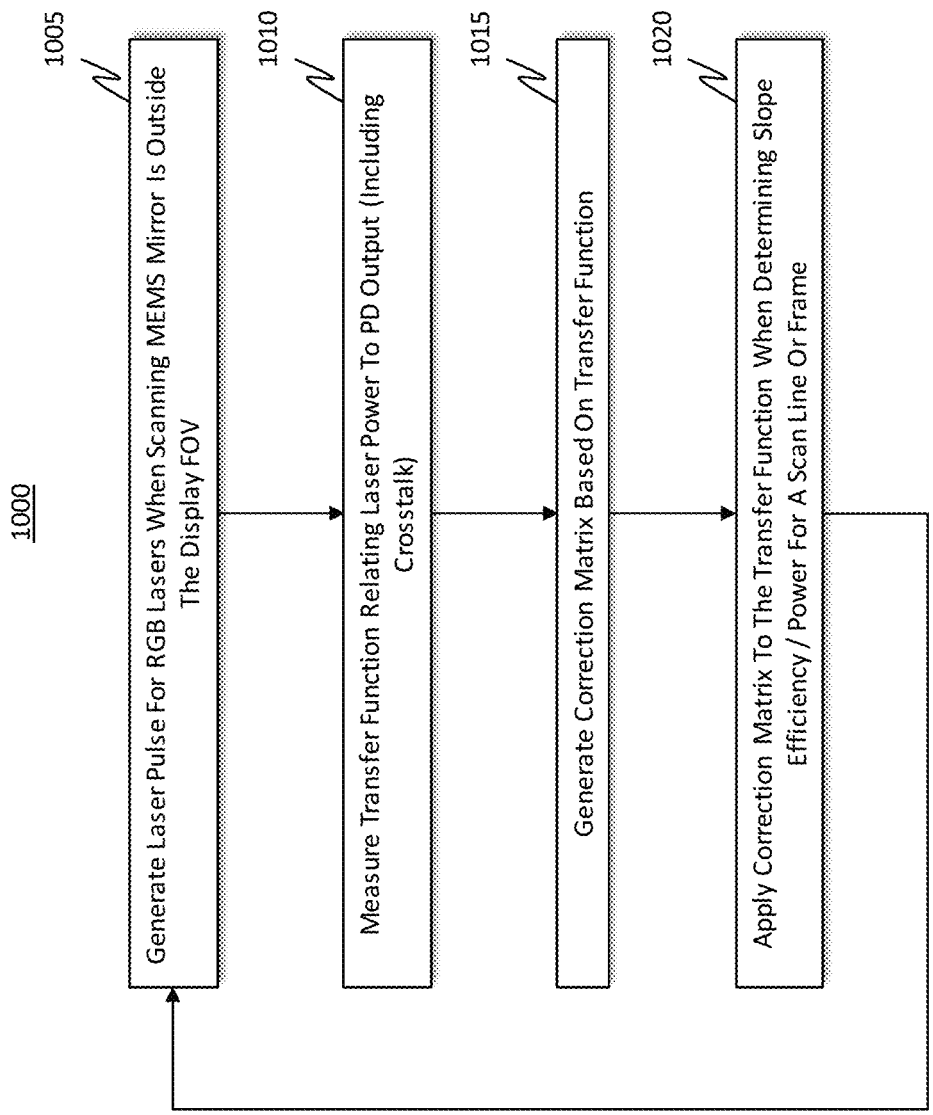
FIG. 10 illustrates an example method for programmatically re-calibrating or adjusting the power output of a laser by modifying the laser's power output transfer function in order to compensate for, or "decontaminate," the effects of cross talk between multiple MPDs.

Turning now to FIG. 10, this Figure illustrates an example method 1000 for accurately estimating how much power is stemming or originating from an illuminator (e.g., performing a threshold current estimation and/or a slope efficiency estimation). Initially, method 1000 includes an act 1005 of generating a laser pulse for one of the RGB lasers while the MEMS mirror system is directing light outside of the display's field of view ("FOV") (or waveguide's FOV). For instance, with reference to FIG. 1, the illuminated area can correspond to either one of the horizontal blanking area 170 or the vertical blanking area 175. These two areas are outside of the display's normal FOV such that the user may not be able to see the projected illumination, which is used to calibrate the device.

Additionally, method 1000 (in its entirety) may be performed first for a first laser (e.g., any one of the red, green, or blue lasers), then it may be performed again for a second laser (e.g., a different one of the red, green, or blue lasers), and then again for a third laser (e.g., yet another one). In this regard, method 1000 may be performed for each individual laser included within the system so as to generate adjustment values to correct each laser when presented with conditions involving crosstalk.

Next, an act 1010 of measuring the transfer function of the laser device using at least a photodetector is performed. To clarify, this transfer function relates laser power to photodetector output, including any crosstalk. As described earlier in connection with FIG. 4, a laser's transfer function is dependent on both the laser's slope efficiency and its laser current threshold. The transfer function generally describes the relationship between the amount of current pumped into the laser device and the amount of light produced by the laser device.

Next, there is an act 1015 of generating a correction matrix based on the transfer function. Further discussion of this operation will be provided later. As a brief introduction, however, the correction matrix is designed to eliminate the effects of crosstalk between multiple photo detectors.

The correction matrix is then applied to the transfer function when determining the slope efficiency or power for a particular scan line or frame (act 1020). The system can repeat for each new image frame to ensure that the laser's output power is accurately determined. Additionally, the cycle can be performed for each one of the lasers in the system.

Figure 11:
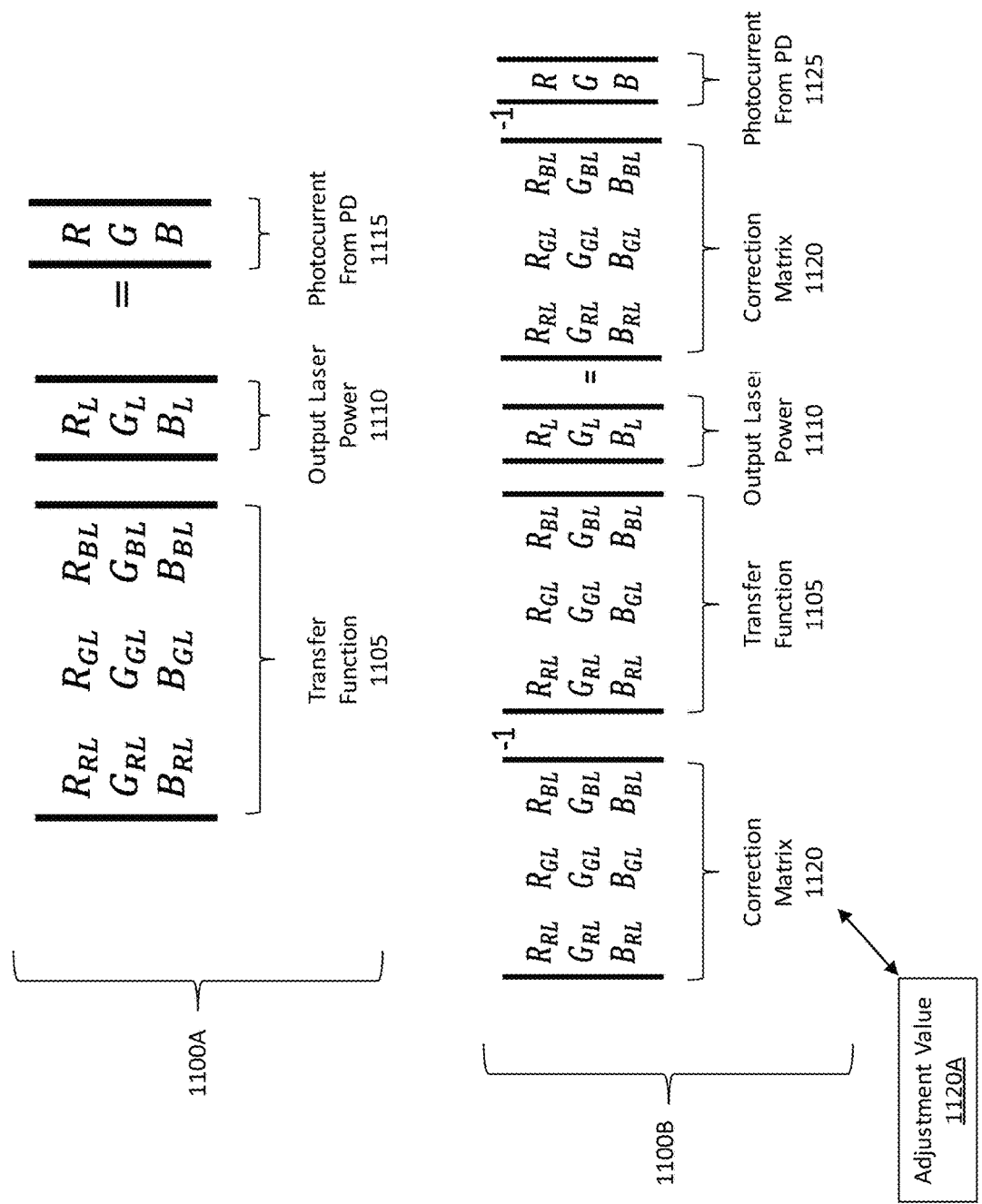
FIG. 11 illustrates an example of how certain adjustments can be applied to the laser's power output transfer function.

FIG. 11 provides a couple of different illustrations regarding the disclosed transfer functions and correction matrices. That is, as described in connection with FIG. 10, one of the first processes in generating an accurate photodetector measurement (which represents the true laser output power) is to consider the relationship between the laser power and the photocurrent from the photodetector. FIG. 11 shows the relationship between laser output power and any measured photocurrent. By applying the disclosed correction matrix (e.g., an inverse of the transfer function), it is possible to mathematically eliminate the impact of optical crosstalk on photodetector measurements.

As an example, suppose it is desirable to determine the optical crosstalk associated with the red laser. Here, the red laser is fired, and the resulting power is measured at the red laser's corresponding photodetector. In additional to measuring a signal at the red laser's photodetector, the green and blue photodetectors are also monitored to determine whether any red laser light leaked to these other photodetectors.

The MEMS system will often illuminate pixels in the blanking areas in order to allow the system to determine the laser's laser current threshold. For instance, suppose the red laser diode is pulsed to emit light directed towards one of the blanking areas. By detecting this emitted light, the system is able to determine the red laser's threshold current. Similar operations can be performed for both the green laser and the blue laser.

With reference to the red laser example, while the red laser is being pulsed, the system can additionally actively monitor not only the red laser's corresponding photodetector but also the green laser's photodetector and the blue laser's photodetector. Because of the overlapping light and imperfect color filters, when the red laser is fired, a response may also be detected at the green and blue lasers' photodetectors. These responses constitute crosstalk because the green and blue photodetectors will incorrectly determine green and blue light is being projected even though only red light is actually being projected.

With reference to equation 1100A in FIG. 11, the photocurrent from PD 1115 constitutes the actual responses measured from the photodetectors while the output laser power 1110 constitutes the amount of power generated by each laser diode. These values are known values as a result of measuring the responses from the photodetectors and as a result of knowing how much current is applied to each laser emitter.

Based on these known values, each entry in the transfer function 1105 can then be filled in to determine the overall transfer function 1105 for each respective laser device. The process of filling out the matrix values is also performed in connection with determining the laser threshold current, so the disclosed operations actually add only a few additional computations (which additional computations are performed to determine and apply the correction matrix).

As an example, suppose 1 mW of power was generated by the red laser (e.g., the $R_L$ value in the output laser power 1110) while 0 mW is generated by the green and blue lasers. In this example, a photocurrent proportional to 0.9 mW may be measured by the red photodetector (corresponding to "R" in the photocurrent from PD 1115), and photocurrent values related to 10% crosstalk may be measured by the green and blue photodetectors (i.e. 90% was detected by the red photodetector while the remaining 10% was detected by the other two photodetectors).

In this example, suppose a photocurrent proportional to 0.05 mW was detected at the green photodetector and 0.05 mW was detected at the blue photodetector. Using these values, the values $R_{RL}$, $R_{GL}$, and $R_{BL}$ in the transfer function 1105 can also be filled in (e.g., 0.9, 0.05, and 0.05, respectively). Similar operations can be performed for the green and blue lasers (e.g., respectively pumping in 1 mW of power and measuring the responses) to then fill out the matrix shown by transfer function 1105. Accordingly, each one of the entries in the matrix shown by the transfer function 1105 is in the form of a transfer function relating an output (e.g., the photocurrent from PD 1115) to an input (e.g., output laser power 1110).

Once the transfer function 1105 matrix is determined (e.g., either during the horizontal or vertical blanking periods), then it is possible to take the transpose of that matrix. The transposed matrix can then be used to cancel out any crosstalk factors. That is, if the transpose is determined, then it is possible to actually determine what each one of the lasers' actual power was. For instance, it is possible to determine the red laser's power, the green laser's power, and the blue laser's power. Such a scenario is shown by equation 1100B.

Here, a correction matrix 1120 (i.e. a type of adjustment value 1120A), which is the transpose of the transfer function 1105, is applied to the transfer function 1105. By doing so, and by knowing the output laser power 1110, it is possible to accurately determine the actual value of each laser's output power, even when crosstalk is present. This is particularly important for accurately measuring the laser power values for white balance. For instance, during a scan line or during a whole frame, the measured red, green, and blue output powers will be summed over the entire frame. Here, if the correction factor is not known, the measured R, G, and B laser power values will be incorrect, due to the presence of optical crosstalk. This will manifest itself by getting the wrong color hue or by having an incorrect white balance. By getting the correct color correction factors, it is possible to correctly set the white-point and to get the hue of the display correct. This can either be done on a per frame basis or can be adjusted several times during a single frame. In this regard, the adjustment value 1120A is effectively able to computationally eliminate the effects of crosstalk within the system.

Figure 12:
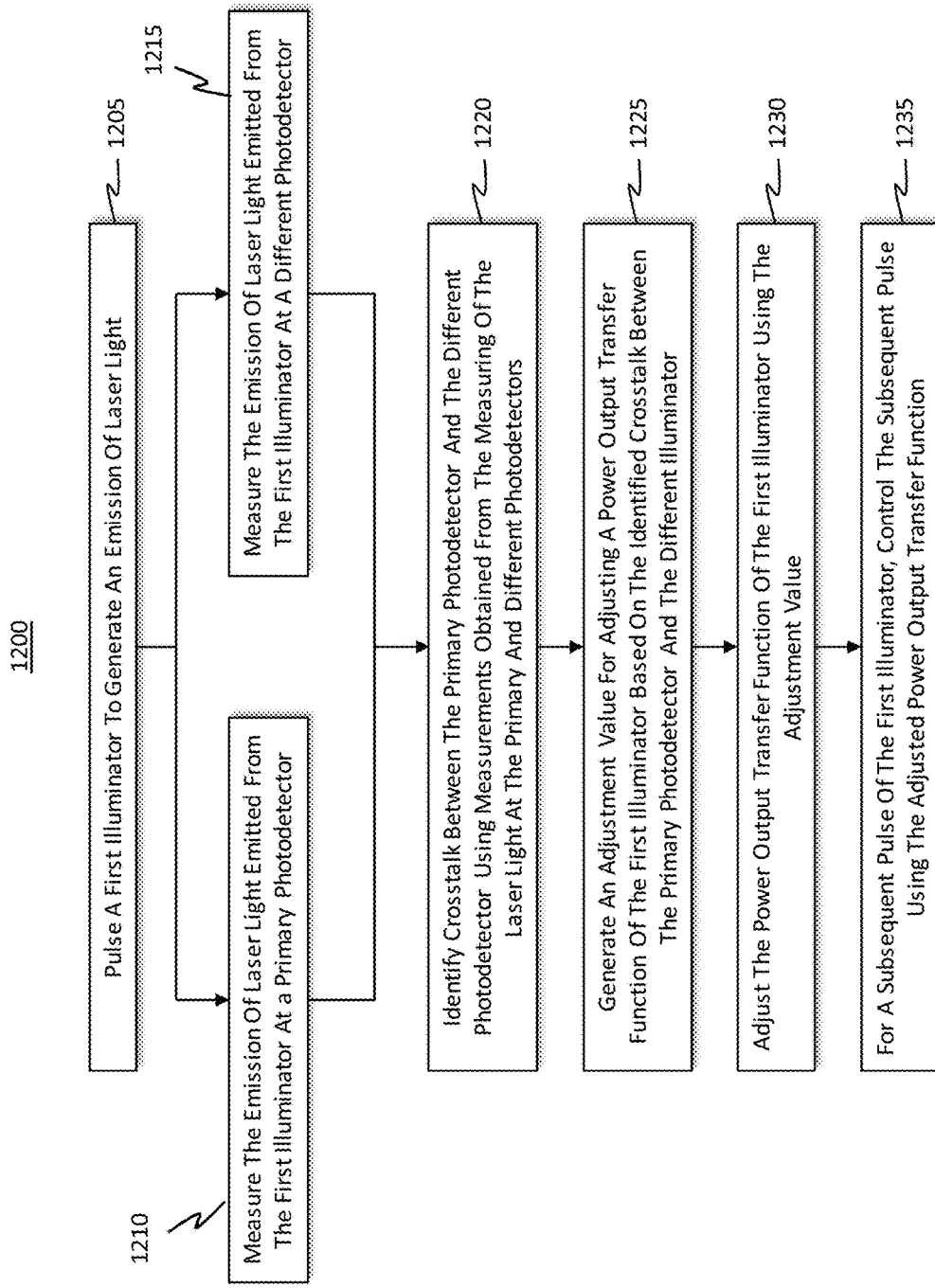
FIG. 12 illustrates another example method for applying adjustments to compensate for crosstalk between multiple MPDs in an ultra-compact illumination/projector module.

Turning now to FIG. 12, there is shown another example method 1200 for eliminating the effects of crosstalk via the use of an adjustment value (e.g., adjustment value 1120A from FIG. 11). Additionally, this method can be performed to control the power output of an illuminator positioned within a shared multi-illuminator housing.

Initially, in act 1205, a first illuminator (e.g., any one of the illuminators discussed throughout this disclosure) is pulsed to generate an emission of laser light. Here, the first illuminator is associated with a primary photodetector. For instance, FIG. 6C shows how different photodetectors can operate as "primary" photodetectors for different laser diodes/illuminators. Additionally, a primary photodetector can operate as a "different" or "secondary" photodetector for another illuminator, as shown in FIG. 6C.

During act 1205 when the first illuminator (e.g., perhaps a red laser) is pulsed to generate the emission of light, a second illuminator (e.g., perhaps a green laser) and even a third illuminator (e.g., perhaps a blue laser), both of which are included in the same housing as the first illuminator, are refrained from generating corresponding emissions of light. Consequently, only the emission of light from the first illuminator is generated during a pulse duration when the first illuminator is being pulsed. As discussed earlier, during the pulse duration of the first illuminator, the emission of laser light can be directed towards a blanking area of the display system's display. Here, the MEMS system can direct the emission of laser light towards the blanking area. In some embodiments, pulsing the first illuminator in act 1205 is performed in a manner so that the emission of laser light is directed to either a vertical or horizontal blanking area.

Next, an act 1210 of measuring the emission of laser light emitted from the first illuminator (or the first set of illuminators, each of which emits the same spectrum of light) is performed at the primary photodetector. Simultaneously with act 1210, act 1215 is performed by measuring the emission of laser light emitted from the first illuminator (or set of illuminators) at a "different" photodetector (e.g., a "secondary" photodetector as shown in FIG. 6C). This different photodetector operates as (or comprises) a primary photodetector for a different illuminator, which is positioned in the shared multi-illuminator housing module with the first illuminator. In other words, the housing includes multiple illuminators, photodetectors, and potentially even color filters, as shown by the earlier figures. This different illuminator comprises a so-called "second" illuminator, and the different photodetector comprises a so-called "second" photodetector. In some instances, method 1200 additionally includes measuring the emission of laser light emitted from the first illuminator at a "third" photodetector, which is a primary photodetector for a third illuminator in the shared multi-illuminator housing module.

Method 1200 also includes an act 1220 of identifying crosstalk between the primary photodetector and the different photodetector using measurements obtained from the measuring of the laser light at the primary and different photodetectors. For instance, by detecting photocurrent responses from both of the primary and different photodetectors (as opposed to only the primary photodetector), it is possible to determine that crosstalk is present in the system. Crosstalk will occur when a photocurrent response is detected or measured by a secondary photodetector (i.e. not the particular laser's primary photodetector), meaning that some light from the first illuminator contaminated, permeated, or otherwise leaked through a color filter of the secondary/different photodetector and was detected by that secondary/different photodetector.

In response, an adjustment value (e.g., adjustment value 1120A from FIG. 11) is generated (act 1225). This adjustment value is provided to adjust a power output transfer function (e.g., transfer function 1105 from FIG. 11) of the first illuminator based on the identified crosstalk between the primary photodetector and the different illuminator.

Then, the power output transfer function of the first illuminator is actually adjusted using the adjustment value (i.e. the adjustment value is applied to the power output transfer function) (act 1230).

Subsequently, for one or more subsequent pulse(s) of the first illuminator, those subsequent pulses are controlled using the adjusted power output transfer function (act 1235). It should be noted that the measurement or generation of the adjustment value can be performed at any time and even at multiple times. For example, the adjustment value can initially be computed during an initial calibration of the illuminators. Additionally, the adjustment value can be periodically computed, such as during the runtime of the illuminators (e.g., between each individual frame or between a set of multiple frames). Using this approach, it is possible to closely correlate the relationship between the laser pulse power and the photocurrent of the photodetectors.

By updating the transfer function matrix, or rather by applying adjustments to the computations, it is possible to determine a more accurate laser current threshold estimation and a more accurate power estimation. In some embodiments, the adjustment value(s) can be embedded in or provided to a calibration table for future reference. These calibration tables are frequently used to ensure that the laser is operating as expected.

Accordingly, the disclosed embodiments are operable to improve laser image quality by better determining, and thereby controlling, the output power of lasers used in the display system. Some embodiments use color filters disposed overtop of a set of photodetectors so as to eliminate the effects of geometrically overlapping laser light. Some additional or alternative embodiments apply computational corrections or adjustments to the laser's transfer function in order to programmatically eliminate the effects of crosstalk.

Example Computer System(s)

Figure 13:
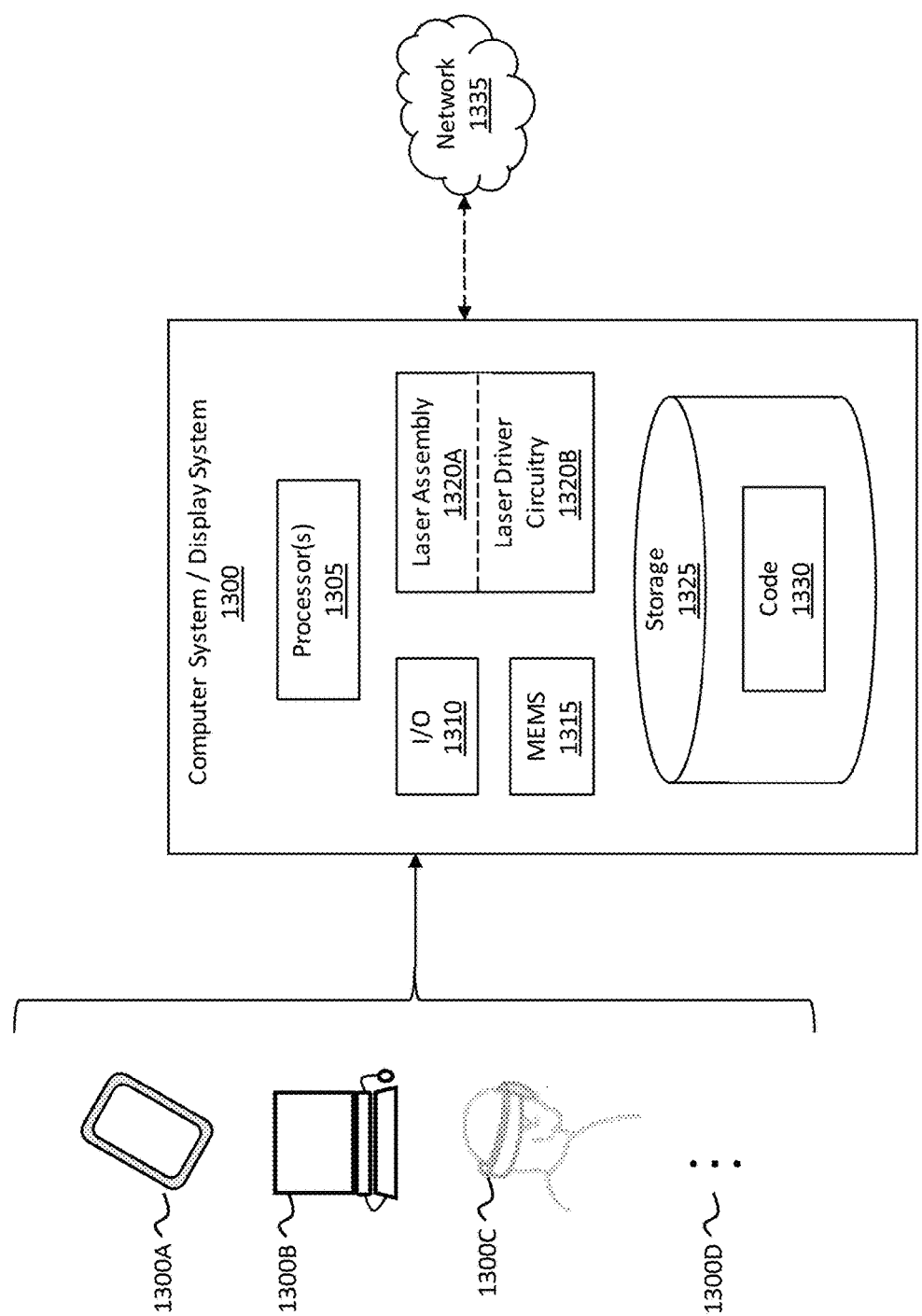
FIG. 13 illustrates an example computer system or display system that can be configured in any of the disclosed manners or that can be configured to perform any of the disclosed operations.

Attention will now be directed to FIG. 13 which illustrates an example computer system 1300 that may be used to facilitate the disclosed methods and/or that may comprise one of the disclosed systems. It will be appreciated that computer system 1300 may be configured within various form factors. For example, computer system 1300 may be embodied as a tablet 1300A, a desktop 1300B, or an HMD 1300C. The ellipsis 1300D demonstrates that computer system 1300 may be embodied in various other forms too. For instance, computer system 1300 may also be a distributed system that includes one or more connected computing components/devices that are in communication with computer system 1300, a laptop computer, a mobile phone, a server, a data center, and/or any other computer system. The ellipsis 1300D also indicates that other system subcomponents may be included or attached with the computer system 1300, including, for example, sensors that are configured to detect sensor data such as environmental conditions that may impact the performance of the lasers.

In its most basic configuration, computer system 1300 includes various different components. For example, FIG. 13 shows that computer system 1300 includes at least one processor 1305 (aka a "hardware processing unit"), input/output ("I/O") 1310, a MEMS mirror system 1315, a laser assembly 1320A with laser driver circuitry 1320B, and storage 1325.

The MEMS mirror system 1315 may be configured in the manners described throughout this disclosure and may include any number of hardware redirecting mirrors (i.e. relay optics) and actuators. The laser assembly 1320A may include the actual lasers/illuminators discussed throughout this disclosure, and the laser driver circuitry 1320B may include any hardware processors or driving mechanisms used to pump a laser with current.

Storage 1325 is shown as including executable code/instructions 1330. Storage 1325 may be physical system memory, which may be volatile, non-volatile, or some combination of the two. The term "memory" may also be used herein to refer to non-volatile mass storage such as physical storage media. If computer system 1300 is distributed, the processing, memory, and/or storage capability may be distributed as well. As used herein, the term "executable module," "executable component," or even "component" can refer to software objects, routines, or methods that may be executed on computer system 1300. The different components, modules, engines, and services described herein may be implemented as objects or processors that execute on computer system 1300 (e.g. as separate threads).

The disclosed embodiments may comprise or utilize a special-purpose or general-purpose computer including computer hardware, such as, for example, one or more processors (such as processor 1305) and system memory (such as storage 1325), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1300 may also be connected (via a wired or wireless connection) to external sensors (e.g., one or more remote cameras, accelerometers, gyroscopes, acoustic sensors, magnetometers, temperature sensors, etc.). Further, computer system 1300 may also be connected through one or more wired or wireless networks 1335 to remote systems(s) that are configured to perform any of the processing described with regard to computer system 1300.

During use, a user of computer system 1300 is able to perceive information (e.g., a mixed-reality environment) through a display screen or waveguide that is included with the I/O 1310 of computer system 1300 and that is visible to the user. The I/O interface(s) and sensors with the I/O 1310 also include gesture detection devices, eye trackers, displays, and/or movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

A graphics rendering engine may also be configured, with processor 1305, to render one or more virtual objects within a mixed-reality scene/environment. As a result, virtual objects can accurately move in response to a movement of the user and/or in response to user input as the user interacts within the virtual scene.

A "network," like the network 1335 shown in FIG. 13, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1300 will include one or more communication channels that are used to communicate with the network 1335. Transmissions media include a network that can be used to carry data or desired program code means in the form of computer-executable instructions or in the form of data structures. Further, these computer-executable instructions can be accessed by a general-purpose or special-purpose computer.

Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 1305). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An ultra-compact projector module comprising:
a plurality of illuminators, each of which emits a different spectrum of light, the plurality of illuminators being positioned relative to each other so that the different spectrums of light emitted from the plurality illuminators geometrically overlap prior to being detected by a plurality of photodetectors;
the plurality of photodetectors being separated by a physical distance between each of the plurality of photodetectors, including a different photodetector for each illuminator in the plurality of illuminators, wherein each photodetector is associated with a corresponding color filter such that the ultra-compact projector module includes a plurality of color filters; and
the plurality of color filters, including a different color filter for each photodetector in the plurality of photodetectors, each color filter being positioned proximately to a corresponding photodetector and in-between the corresponding photodetector and a corresponding illuminator, each color filter included among the plurality of color filters passes a corresponding spectrum of light while filtering out other spectrums of light and such that each photodetector included among the plurality of photodetectors receives spectrally filtered light having passed through at least one of the plurality of color filters, each color filter having a surface area that is larger is size than a surface area of the proximally positioned and corresponding photodetector.

2. The ultra-compact projector module of claim 1, wherein a pitch distance between any two adjacent photodetectors included among the plurality of photodetectors comprises at least 0.2 millimeters.

3. The ultra-compact projector module of claim 1, wherein light paths originating at the plurality of illuminators define directions of travel for the different spectrums of light emitted by the plurality of illuminators, and wherein one or more collimating optic(s) are positioned within the light paths subsequent to a point where the different spectrums of light are directed towards the plurality of photodetectors relative to the directions of travel.

4. The ultra-compact projector module of claim 1, wherein light paths originating at the plurality of illuminators define directions of travel for the different spectrums of light emitted by the plurality of illuminators, and wherein a single collimating optic is positioned within the light paths prior to the plurality of photodetectors relative to the directions of travel.

5. The ultra-compact projector module of claim 1, wherein light paths originating at the plurality of illuminators define directions of travel for the different spectrums of light emitted by the plurality of illuminators, and wherein a microelectromechanical scanning (MEMS) mirror system is positioned within the light paths subsequent to a point where the different spectrums of light are directed towards the plurality of photodetectors relative to the directions of travel.

6. The ultra-compact projector module of claim 1, wherein the different spectrums of light emitted by the plurality of illuminators are spatially overlapping due to divergence angles of the plurality of illuminators.

7. The ultra-compact projector module of claim 6, wherein the beam combiner is positioned along a light travel path subsequent to a collimation optic, which collimates the different spectrums of light.

8. The ultra-compact projector module of claim 1, wherein a design of each color filter in the plurality of color filters relative to emission directions of light emitted by the plurality of illuminators is set to accommodate differing incident angles of light striking said each color filter to enable said each color filter to pass its corresponding spectrum of light while filtering out other spectrums of light.

9. The ultra-compact projector module of claim 8, wherein separate multi-layer dielectric coatings are provided on each photodetector included in the plurality of photodetectors to accommodate differing spectral characteristics and the differing incident angles of the light emitted by the plurality of illuminators.

10. The ultra-compact projector module of claim 1, wherein a configuration of at least one color filter included in the plurality of color filters includes:
   a dielectric coating disposed on glass that is positioned adjacent to a corresponding photodetector, or, alternatively,
   an integrated dielectric stack applied directly to the corresponding photodetector.

11. The ultra-compact projector module of claim 1, wherein each of the photodetectors are positioned in a linear configuration on a single chip.

12. An ultra-compact projector module comprising:
   a first illuminator that emits a first spectrum of light, wherein a first photodetector is configured to determine a first power output of the first illuminator based on detecting at least a portion of the first spectrum of light;
   a first color filter that is positioned between the first illuminator and the first photodetector, the first color filter filtering out spectrums of light different from the first spectrum of light such that the first photodetector detects the first spectrum of light and avoids detecting the spectrums of light different from the first spectrum of light;
   a second illuminator that emits a second spectrum of light, wherein a second photodetector is configured to determine a second power output of the second illuminator based on detecting at least a portion of the second spectrum of light; and
   a second color filter that is positioned between the second illuminator and the second photodetector, the second color filter filtering out spectrums of light different from the second spectrum of light such that the second photodetector detects the second spectrum of light and avoids detecting the spectrums of light different from the second spectrum of light;
   wherein, as a result of a pitch distance between the first illuminator and the second illuminator being within a predetermined range:
   some of the second spectrum of light spatially overlaps some of the first spectrum of light received at the first color filter, the first color filter filtering out the some of the second spectrum of light such that the some of the second spectrum of light is prevented from reaching the first photodetector, or, alternatively,
   some of the first spectrum of light spatially overlaps some of the second spectrum of light received at the second color filter, the second color filter filtering out the some of the first spectrum of light such that the some of the first spectrum of light is prevented from reaching the second photodetector.

13. The ultra-compact projector module of claim 12, wherein the predetermined range of the pitch distance is between 0.2 millimeters and 2.0 millimeters.

14. The ultra-compact projector module of claim 12, wherein at least one of the first and second color filter comprises a stack of dielectric coatings disposed on glass that is positioned adjacent to a corresponding first or second photodetector, respectively.

15. The ultra-compact projector module of claim 12, wherein at least one of the first and second color filter comprises an integrated dielectric material applied directly to a corresponding first or second photodetector, respectively.

16. The ultra-compact projector module of claim 12, wherein the ultra-compact illumination module further includes:
   a third illuminator that emits a third spectrum of light, wherein a third photodetector is configured to determine a third power output of the third illuminator based on detecting at least a portion of the third spectrum of light;
   a third color filter that is positioned between the third illuminator and the third photodetector, the third color filter filtering out spectrums of light different from the third spectrum of light such that the third photodetector detects the third spectrum of light and avoids detecting the spectrums of light different from the third spectrum of light; and
   wherein, as a result of a second pitch distance between i) the third illuminator and ii) either one of the first illuminator or the second illuminator also being within the predetermined range:
   some of either the first or second spectrum of light spatially overlaps some of the third spectrum of light received at the third color filter, the third color filter filtering out the some of the first or second spectrums of light such that the some of the first or second spectrums of light is prevented from reaching the third photodetector, or, alternatively,
   some of the third spectrum of light spatially overlaps some of either the first or second spectrums of light received at either the first or second color filters, the first or second color filters filtering out the some of the third spectrum of light such that the some of the third spectrum of light is prevented from reaching either the first photodetector or the second photodetector.

17. The ultra-compact projector module of claim 12, wherein the first illuminator is one of a red laser, a green laser, a blue laser.

18. The ultra-compact projector module of claim 17, wherein the second illuminator is an infrared laser.

19. An ultra-compact illumination module comprising:
   a plurality of illuminators, each of which emits a different spectrum of light, wherein pitch distances between any two illuminators in the plurality of illuminators are set to compact values of less than about 1.0 millimeter such that the different spectrums of light spatially overlap prior to being detected by a plurality of photodetectors;
   the plurality of photodetectors, each of which is associated with a corresponding one illuminator included among the plurality of illuminators; and
   a plurality of color filters, including a different color filter for each photodetector in the plurality of photodetectors, each color filter being positioned proximately to a corresponding photodetector and in-between the corresponding photodetector and a corresponding illuminator, such that each color filter included among the plurality of color filters passes a corresponding spectrum of light while filtering out other spectrums of light and such that each photodetector included among the plurality of photodetectors receives spectrally filtered light having passed through at least one of the plurality of color filters, at least one of the plurality of color filters comprising at least one of a dielectric coating disposed on glass that is positioned adjacent to a corresponding photodetector, or an integrated dielectric material applied directly to the corresponding photodetector.

20. The ultra-compact illumination module of claim 19, wherein the at least one of the plurality of color filters comprises the dielectric coating disposed on glass that is positioned adjacent to the corresponding photodetector.

21. The ultra-compact illumination module of claim 19, wherein the at least one of the plurality of color filters comprises the integrated dielectric material applied directly to the corresponding photodetector.

22. A display system comprising:
one or more processor(s); and
one or more computer-readable hardware storage device(s) having stored thereon computer-executable instructions that are executable by the one or more processor(s) to control a power output of an illuminator by causing the display system to at least:
pulse a first illuminator to generate an emission of laser light, the first illuminator being associated with a primary photodetector configured to measure power output of the first illuminator;
measure the emission of laser light emitted from the first illuminator at the primary photodetector;
measure the emission of laser light emitted from the first illuminator at a different photodetector, the different photodetector comprising a primary photodetector for a different illuminator which is positioned in a shared housing with the first illuminator and that is configured to measure power output of the different illuminator that emits light of a different color than the first illuminator;
identify crosstalk between the primary photodetector and the different photodetector using measurements obtained from the measuring of the laser light at the primary and different photodetectors;
generate an adjustment value for adjusting a power output transfer function of the first illuminator based on the identified crosstalk between the primary photodetector and the different illuminator;
adjust the power output transfer function of the first illuminator using the adjustment value; and
for a subsequent pulse of the first illuminator, control the subsequent pulse using the adjusted power output transfer function.

23. The display system of claim 22, wherein, when the first illuminator is pulsed to generate the emission of light, a second illuminator and a third illuminator, which are also included within the housing, are refrained from generating corresponding emissions of light such that only the emission of light from the first illuminator is generated during a pulse duration when the first illuminator is pulsed.

24. The display system of claim 23, wherein, during the pulse duration, the emission of laser light is directed towards a blanking area of a display of the display system.

25. The display system of claim 22, the different illuminator comprising a second illuminator and the different photodetector comprising a second photodetector, the method further comprising:
measuring the emission of laser light emitted from the first illuminator at a third photodetector that is a primary photodetector for a third illuminator in the shared multi-illuminator housing module.

26. The display system of claim 22, wherein stray light within the shared housing causes the crosstalk between the primary photodetector and the different photodetector.

27. The display system of claim 22, wherein the first illuminator, which generates the emission of laser light, includes a plurality of laser emitters, and wherein each laser emitter in the plurality of laser emitters emits light in a common light spectrum.

28. The display system of claim 22, wherein the primary photodetector and the different photodetector are separated by a physical distance between the primary photodetector and the different photodetector by at least 0.2 mm.

* * * * *

UNITED STATES PATENT AND TRADEMARK OFFICE
CERTIFICATE OF CORRECTION

PATENT NO. : 11,233,980 B2  
APPLICATION NO. : 16/440597  
DATED : January 25, 2022  
INVENTOR(S) : Raymond Kirk Price et al.

It is certified that error appears in the above-identified patent and that said Letters Patent is hereby corrected as shown below:

On the Title Page

In Item (73), Assignee  
Line 1, change "MICROSOFT TECHNOLOGLY LICENSING, LLC" to --MICROSOFT TECHNOLOGY LICENSING, LLC--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*